United States Patent
Hmimy et al.

(10) Patent No.: US 10,980,025 B2
(45) Date of Patent: Apr. 13, 2021

(54) METHODS AND APPARATUS FOR FREQUENCY TRANSITION MANAGEMENT IN A QUASI-LICENSED WIRELESS SYSTEM

(71) Applicant: Charter Communications Operating, LLC, St. Louis, MO (US)

(72) Inventors: Hossam Hmimy, Aurora, CA (US); Mohamed Daoud, Englewood, CO (US); Matthew Hubbard, Centennial, CO (US)

(73) Assignee: CHARTER COMMUNICATIONS OPERATING, LLC, St Louis, MO (US)

(*) Notice: Subject to any disclaimer, the term of this patent is extended or adjusted under 35 U.S.C. 154(b) by 0 days.

(21) Appl. No.: 16/427,186

(22) Filed: May 30, 2019

(65) Prior Publication Data

US 2020/0252933 A1 Aug. 6, 2020

Related U.S. Application Data

(60) Provisional application No. 62/799,454, filed on Jan. 31, 2019.

(51) Int. Cl.
*H04W 4/00* (2018.01)
*H04W 72/04* (2009.01)
(Continued)

(52) U.S. Cl.
CPC ... *H04W 72/0453* (2013.01); *H04W 36/0072* (2013.01); *H04W 36/30* (2013.01)

(58) Field of Classification Search
USPC ..... 370/329, 311, 312, 252, 461; 455/426.1, 455/434, 436
See application file for complete search history.

(56) References Cited

U.S. PATENT DOCUMENTS 6,154,648 A 11/2000 Comer
6,356,560 B1* 3/2002 Venters ............... H04L 12/2854
370/461

(Continued)

OTHER PUBLICATIONS

"Internet Protocol DARPA Internet Program Protocol Specification, IETF RCF 791 (Sep. 1981) and Deering et al., Internet Protocol, Version 6 (IPv6) Specification, IETF RFC 2460 (Dec. 1998),".

(Continued)

*Primary Examiner* — David Q Nguyen
(74) *Attorney, Agent, or Firm* — Gazdzisnki & Associates, PC

(57) ABSTRACT

Methods and apparatus for managing frequency reassignment within wireless access nodes so as to minimize data session disruption. In one embodiment, the frequency reassignments occur within a quasi-licensed system utilizing 3.5 GHz CBRS (Citizens Broadband Radio Service) spectrum, and a reassignment of wireless spectrum that mitigates disruption or loss of continuity to existing data sessions of users of devices associated with a CBSD/xNB is provided via notification of the associated devices (e.g., Category B Consumer Premises Equipment or CPE, such as an FWA) of the reassignment by the CBSD/xNB. In one variant, the associated devices are instructed by the CBSD/xNB to invoke a "wait and re-establish" protocol that obviates a full frequency band rescan in favor of a designated target frequency provided to the CBSD/xNB by the cognizant SAS or DP.

20 Claims, 16 Drawing Sheets

(51) Int. Cl.
*H04W 36/30* (2009.01)
*H04W 36/00* (2009.01)

(56) References Cited

U.S. PATENT DOCUMENTS

| | | | |
|---|---|---|---|
| 8,997,136 B2 | 3/2015 | Brooks et al. | |
| 9,258,809 B2 | 2/2016 | Liao | |
| 9,386,496 B2* | 7/2016 | Gupta | H04W 24/02 |
| 9,699,663 B1 | 7/2017 | Jovancevic | |
| 9,769,692 B2 | 9/2017 | Freda et al. | |
| 9,807,778 B2 | 10/2017 | Ma et al. | |
| 9,813,148 B2 | 11/2017 | Syed et al. | |
| 10,135,730 B2 | 11/2018 | Chou | |
| 10,340,976 B2 | 7/2019 | Kakinada et al. | |
| 10,405,192 B2 | 9/2019 | Kakinada et al. | |
| 10,484,876 B2* | 11/2019 | Shah | H04W 36/08 |
| 10,492,204 B2 | 11/2019 | Kakinada et al. | |
| 10,506,456 B2 | 12/2019 | Lou et al. | |
| 10,536,859 B2 | 1/2020 | Gunasekara et al. | |
| 10,680,883 B2 | 6/2020 | Hall et al. | |
| 2009/0034443 A1* | 2/2009 | Walker | H04W 52/0206 370/311 |
| 2013/0122903 A1 | 5/2013 | Farnsworth | |
| 2013/0281092 A1* | 10/2013 | Gassend | H04W 36/30 455/436 |
| 2013/0288675 A1* | 10/2013 | Gassend | H04W 36/30 455/434 |
| 2013/0315124 A1* | 11/2013 | Rapaport | H04W 4/08 370/312 |
| 2013/0336175 A1 | 12/2013 | Um et al. | |
| 2014/0106672 A1 | 4/2014 | Jeon et al. | |
| 2014/0269526 A1 | 9/2014 | Mitola, III | |
| 2014/0308986 A1 | 10/2014 | Yang et al. | |
| 2015/0055623 A1 | 2/2015 | Li et al. | |
| 2015/0071239 A1 | 3/2015 | Zhang et al. | |
| 2015/0208262 A1* | 7/2015 | Siomina | H04W 24/10 370/252 |
| 2015/0280847 A1* | 10/2015 | Somasundaram | H04L 5/0048 370/252 |
| 2015/0373741 A1 | 12/2015 | Yerramalli et al. | |
| 2016/0007147 A1 | 1/2016 | Zhang et al. | |
| 2016/0073259 A1 | 3/2016 | Lee et al. | |
| 2016/0234746 A1* | 8/2016 | Gopal | H04W 36/26 |
| 2016/0330743 A1* | 11/2016 | Das | H04L 67/02 |
| 2017/0155703 A1 | 6/2017 | Hao et al. | |
| 2017/0208540 A1 | 7/2017 | Egner et al. | |
| 2017/0303138 A1 | 10/2017 | Barmettler et al. | |
| 2018/0007587 A1 | 1/2018 | Feldman et al. | |
| 2018/0115903 A1 | 4/2018 | Badic et al. | |
| 2018/0132112 A1 | 5/2018 | Khoshnevisan et al. | |
| 2018/0146058 A1 | 5/2018 | Somayazulu et al. | |
| 2018/0234403 A1 | 8/2018 | Casella et al. | |
| 2018/0235007 A1 | 8/2018 | Gou et al. | |
| 2018/0255576 A1 | 9/2018 | Bhorkar et al. | |
| 2018/0279212 A1 | 9/2018 | Malik et al. | |
| 2018/0316563 A1 | 11/2018 | Kumar et al. | |
| 2018/0352386 A1 | 12/2018 | Gunasekara et al. | |
| 2019/0021012 A1 | 1/2019 | Beck et al. | |
| 2019/0028182 A1 | 1/2019 | Smyth | |
| 2019/0081690 A1 | 3/2019 | Mueck et al. | |
| 2019/0082447 A1 | 3/2019 | Harsha et al. | |
| 2019/0098510 A1 | 3/2019 | Guo et al. | |
| 2019/0104551 A1 | 4/2019 | Deenoo et al. | |
| 2019/0150182 A1 | 5/2019 | Koorapaty et al. | |
| 2019/0182895 A1 | 6/2019 | Di Girolamo et al. | |
| 2019/0230613 A1 | 7/2019 | Kim et al. | |
| 2019/0239190 A1 | 8/2019 | Patel et al. | |
| 2019/0320490 A1 | 10/2019 | Liu et al. | |
| 2019/0364565 A1* | 11/2019 | Hmimy | H04W 36/06 |
| 2019/0394790 A1 | 12/2019 | Damnjanovic et al. | |
| 2020/0021689 A1 | 1/2020 | Sultana et al. | |

OTHER PUBLICATIONS

Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1, Jan. 3, 2018.

* cited by examiner

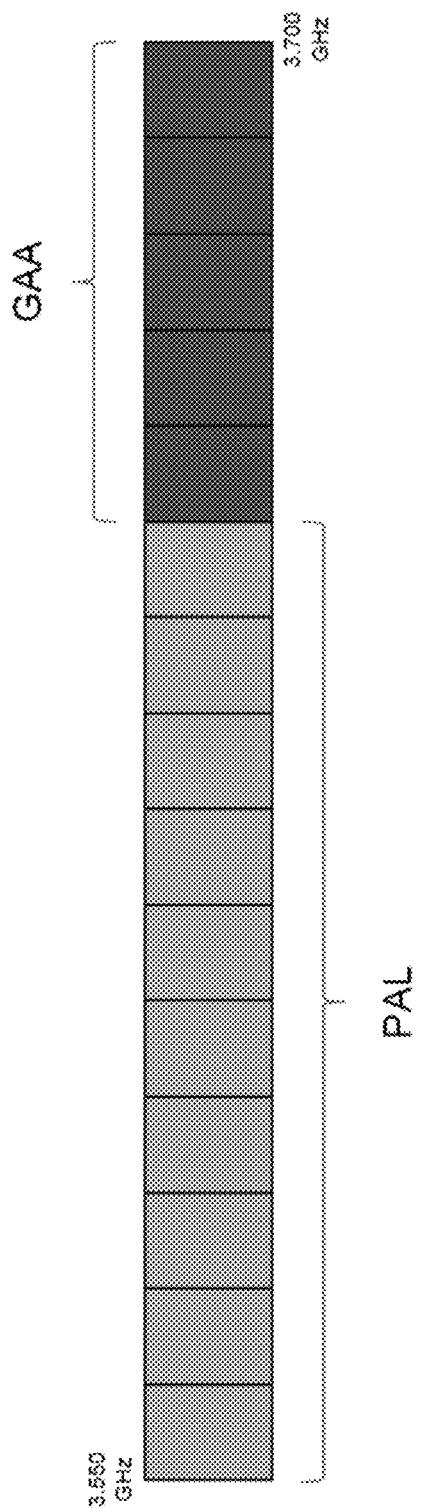

METHODS AND APPARATUS FOR FREQUENCY TRANSITION MANAGEMENT IN A QUASI-LICENSED WIRELESS SYSTEM

RELATED APPLICATIONS

This application claims priority benefit of U.S. Provisional Patent Application Ser. No. 62/799,454 filed Jan. 31, 2019 and entitled "METHODS AND APPARATUS FOR FREQUENCY TRANSITION MANAGEMENT IN A QUASI-LICENSED WIRELESS SYSTEM, which is incorporated herein by reference in its entirety.

The subject matter of this application is generally related to co-owned and co-pending U.S. patent application Ser. No. 15/902,833 filed Feb. 22, 2018 and entitled "METHODS AND APPARATUS FOR ALLOCATION AND RECONCILIATION OF QUASI-LICENSED WIRELESS SPECTRUM ACROSS MULTIPLE ENTITIES," which claims priority to U.S. Provisional Patent Application Ser. No. 62/617,549 filed Jan. 15, 2018 of the same title, as well as U.S. patent application Ser. No. 15/677,940 filed Aug. 15, 2017 and entitled "METHODS AND APPARATUS FOR DYNAMIC CONTROL AND UTILIZATION OF QUASI-LICENSED WIRELESS SPECTRUM", as well as Ser. No. 15/785,283 filed Oct. 16, 2017 and entitled "METHODS AND APPARATUS FOR COORDINATED UTILIZATION OF QUASI-LICENSED WIRELESS SPECTRUM," and Ser. No. 15/814,133 filed Nov. 15, 2017 and entitled "METHODS AND APPARATUS FOR UTILIZATION OF QUASI-LICENSED WIRELESS SPECTRUM FOR IOT (INTERNET-OF-THINGS) SERVICES," each of the foregoing incorporated herein by reference in its entirety. The subject matter of this application is also generally related to the subject matter of U.S. patent application Ser. No. 15/986,614 entitled "METHODS AND APPARATUS FOR INTRA-CELL AND INTER-FREQUENCY MOBILITY OPTIMIZATION AND MITIGATION OF SESSION DISRUPTION IN A QUASI-LICENSED WIRELESS SYSTEM" filed May 22, 2018 and incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks and specifically, in one or more exemplary embodiments, to methods and apparatus for dynamically reassigning radio frequency spectrum, such as for example those providing connectivity via quasi-licensed Citizens Broadband Radio Service (CBRS) technologies.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules. In the United States, regulatory responsibility for the radio spectrum is divided between the U.S. Federal Communications Commission (FCC) and the National Telecommunications and Information Administration (NTIA). The FCC, which is an independent regulatory agency, administers spectrum for non-Federal use (i.e., state, local government, commercial, private internal business, and personal use) and the NTIA, which is an operating unit of the Department of Commerce, administers spectrum for Federal use (e.g., use by the Army, the FAA, and the FBI). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
| --- | --- |
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
| --- | --- | --- | --- | --- |
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |

TABLE 2-continued

| Frequency range | Type | Center frequency | Availability | Licensed users |
|---|---|---|---|---|
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

CBRS—

In 2016, the FCC made available Citizens Broadband Radio Service (CBRS) spectrum in the 3550-3700 MHz (3.5 GHz) band, making 150 MHz of spectrum available for mobile broadband and other commercial users. The CBRS is unique, in that it makes available a comparatively large amount of spectrum (frequency bandwidth) without the need for expensive auctions, and without ties to a particular operator or service provider.

Moreover, the CBRS spectrum is suitable for shared use between government and commercial interests, based on a system of existing "incumbents," including the Department of Defense (DoD) and fixed satellite services. Specifically, a three-tiered access framework for the 3.5 GHz is used; i.e., (i) an Incumbent Access tier 102, (ii) Priority Access tier 104, and (iii) General Authorized Access tier 106. See FIG. 1. The three tiers are coordinated through one or more dynamic Spectrum Access Systems (SAS) 202 as shown in FIG. 2 and Appendix I (including e.g., Band 48 therein).

Incumbent Access (existing DOD and satellite) users 102 include authorized federal and grandfathered Fixed Satellite Service (FSS) users currently operating in the 3.5 GHz band shown in FIG. 1. These users will be protected from harmful interference from Priority Access License (PAL) and General Authorized Access (GAA) users. The sensor networks, operated by Environmental Sensing Capability (ESC) operators, make sure that incumbents and others utilizing the spectrum are protected from interference.

The Priority Access tier 104 (including acquisition of spectrum for up to three years through an auction process) consists of Priority Access Licenses (PALs) that will be assigned using competitive bidding within the 3550-3650 MHz portion of the band. Each PAL is defined as a non-renewable authorization to use a 10 MHz channel in a single census tract for three years. Up to seven (7) total PALs may be assigned in any given census tract, with up to four PALs going to any single applicant. Applicants may acquire up to two-consecutive PAL terms in any given license area during the first auction.

The General Authorized Access tier 106 (for any user with an authorized 3.5 GHz device) is licensed-by-rule to permit open, flexible access to the band for the widest possible group of potential users. General Authorized Access (GAA) users are permitted to use any portion of the 3550-3700 MHz band not assigned to a higher tier user and may also operate opportunistically on unused Priority Access License (PAL) channels. See FIG. 2a.

The FCC's three-tiered spectrum sharing architecture of FIG. 1 utilizes "fast-track" band (3550-3700 MHz) identified by PCAST and NTIA, while Tier 2 and 3 are regulated under a new Citizens Broadband Radio Service (CBRS). CBSDs (Citizens Broadband Radio Service Devices—in effect, wireless access points) 206 (FIG. 2) can only operate under authority of a centralized Spectrum Access System (SAS) 202. Rules are optimized for small-cell use, but also accommodate point-to-point and point-to-multipoint, especially in rural areas.

Under the FCC system, the standard SAS 202 includes the following elements: (1) CBSD registration; (2) interference analysis; (3) incumbent protection; (4) PAL license validation; (5) CBSD channel assignment; (6) CBSD power limits; (7) PAL protection; and (8) SAS-to-SAS coordination. As shown in FIG. 2, these functions are provided for by, inter alia, an incumbent detection (i.e., environmental sensing) function 207 configured to detect use by incumbents, and an incumbent information function 209 configured to inform the incumbent when use by another user occurs. An FCC database 211 is also provided, such as for PAL license validation, CBSD registration, and other functions.

An optional Domain Proxy (DP) 208 is also provided for in the FCC architecture. Each DP 208 includes: (1) SAS interface GW including security; (2) directive translation between CBSD 206 and domain commands; (3) bulk CBSD directive processing; and (4) interference contribution reporting to the SAS.

A domain is defined is any collection of CBSDs 206 that need to be grouped for management; e.g.: large enterprises, venues, stadiums, train stations. Domains can be even larger/broader in scope, such as for example a terrestrial operator network. Moreover, domains may or may not use private addressing. A Domain Proxy (DP) 208 can aggregate control information flows to other SAS, such as e.g., a Commercial SAS (CSAS, not shown), and generate performance reports, channel requests, heartbeats, etc.

CBSDs 206 can generally be categorized as either Category A or Category B. Category A CBSDs have an EIRP or Equivalent Isotropic Radiated Power of 30 dBm (1 Watt)/10 MHz, fixed indoor or outdoor location (with an antenna<6 m in length if outdoor). Category B CBSDs have 47 dBm EIRP (50 Watts)/10 MHz, and fixed outdoor location only. Professional installation of Category B CBSDs is required, and the antenna must be less than 6 m in length. All CBSD's have a vertical positioning accuracy requirement of +/−3 m. Terminals (i.e., user devices akin to UE) have 23 dBm EIRP (0.2 Watts)/10 MHz requirements, and mobility of the terminals is allowed.

In terms of spectral access, CBRS utilizes a time division duplex (TDD) multiple access architecture.

Unaddressed Issues of Service Continuity and Frequency Management—

Extant CBRS architectures, while promising from the standpoint of reduced contention for spectrum, currently lack mechanisms for maintaining service continuity under various scenarios such as frequency change. In particular, in the extant CBRS ecosystem, many devices including higher-power outdoor devices functioning as Consumer Premises Equipment (CPE) are treated or classified as CBSD Category B devices, and must register with the cognizant SAS similar to an eNB/CBSD. As previously noted, Category A devices can transmit up 30 dbm (1 watt)/10 MHz, while Category B devices can transmit up to about 50 dbm/10 MHz, so the average coverage area can vary widely. In practical terms, a Category A device may have a working range on the order of hundreds of feet, while a Category B device may operate out to thousands of feet or more, the propagation and working range dictated by a number of factors, including the presence of RF or other interferers, physical topology of the venue/area, energy detection or sensitivity of the receiver, etc.

Currently, as shown in FIG. 2b, a CBSD/eNB 206 registers with SAS and obtains a frequency assignment (step 222). Then, the CPE 200 "attaches" to the CBSD/eNB 206 (step 224), such as via scan of one or more frequency bands to detect emissions from the CBSD/eNB. Once the attachment is complete, the CPE's first task is to register with a SAS 201, 202 (step 226). As shown in FIG. 2 discussed above, the CBSD/eNB 206 and CPE 220 SAS registration may occur via a DP (domain proxy) 208, or directly with a device having SAS functionality.

However, the SAS 201, 202 currently has no mechanism by which to associate a CPE 220 with any given CBSD/eNB 206. Rather, the SAS sees both devices effectively as separate CBSDs registered to that SAS. If, for any reason, the SAS changes the CBSD/eNB's frequency (such as e.g., due to incumbent detection), the CBSD/eNB 206 will have to restart or block its cells for a time period until the frequency change is effected. The CPE 220 will not receive the same frequency change command from the SAS, because the SAS views the CBSD/eNB and the CPE as separate entities. Moreover, if a SAS invokes a global frequency change to all registered CBSDs within a given area, there is no guarantee that the CBSD/eNB and CPE connected to it will be assigned the same frequency. This is because the SAS views both the CPE and the CBSD/xNB as "CBSD," but does not (under the prior art) have a way to identify which CPE is connected to which CBSD/eNB. For example, in a given geographical location or region, a CBSD/eNB and any CPE attached to it may be subject to a frequency change invoked by the cognizant SAS. Because the SAS has no data on the relationship between the (attached) CPE and the CBSD/eNB, each may be assigned a different frequency. Alternatively, the SAS may simply order the CBSD/eNB to change frequency (without similarly ordering the attached CPE to do so). Either of the aforementioned cases will result in the CPE losing connection, and again scanning the entire band to find the CBSD/eNB, resulting in long delays and less-than-optimal service to the end customer.

As shown in FIG. 2c, as a result of the CBSD/eNB frequency change ordered by the SAS (step 228), the CPE 220 will lose service until the CBSD/eNB 206 completes the frequency change, and can be detected (again) (i.e., once the CBSD/eNB is up and starts transmitting, the CPE 220 will scan the entire band again per step 230 before it can attach and perform SAS registration per step 232).

Moreover, the CPE 220 reattaching and scanning the entire band can, based on the implementation, take an appreciable period of time (up to several minutes), which means long periods of "downtime" for any users or customers which may be utilizing the CPE 220 as an access point for data or other services. This significantly degrades user experience, and may lead to users or customers not choosing to utilize or subscribe to the service(s).

SUMMARY

The present disclosure addresses the foregoing needs by providing, inter alia, methods and apparatus for providing wireless spectrum allocation/re-allocation while maintaining service continuity for, inter alia, attached CPE.

In one aspect, a method for providing wireless spectrum reassignment is disclosed. In one embodiment, the wireless spectrum being allocated comprises CBRS-band spectrum with the GAA portion, and the method includes communicating data between at least one CBSD/xNB to one or more CPE attached thereto to both (i) cause the CPE to wait a prescribed period of time before attempting to re-attach to the CBSD/xNB, and (ii) use the SAS-designated new channel for direct re-attachment (versus using a broad band scan or similar search method).

In one variant, the new channel is the new (final) target channel. In another variant, the new channel comprises a temporary or ephemeral channel that is used as a "bridge" channel to the final new target channel.

In another aspect, a method for reassigning at least a portion of available wireless spectrum for a wireless access point is disclosed. In one embodiment, the method includes: determining that at least one RF (radio frequency) carrier requires reassignment to a new carrier; transmitting from a node a first information element (IE) to the wireless access point specifying (i) the selected new RF carrier and (ii) a timer value; receiving communication at the node from the wireless access point via the selected new RF carrier after the timer value expires.

In one implementation, the method is further configured to maintain data session continuity, and further includes: causing the wireless access point to suspend one or more operations on constituent UE or served devices until the timer expires and the access point successfully re-attaches to the node.

In a further implementation, the wireless access point includes a CBRS (Citizens Broadband Radio Service)-compliant CPE, and the node includes a CBRS-compliant and 3GPP compliant eNB or gNB.

In yet a further variant, the determining that at least one RF carrier requires reassignment is performed by a CBRS SAS (spectrum access system) entity.

In another aspect of the disclosure, a computerized wireless access apparatus configured for providing wireless access to a plurality of computerized wireless-enabled mobile devices via a quasi-licensed portion of a radio frequency (RF) spectrum is disclosed. In one embodiment, the computerized wireless access includes: a wireless interface configured to transmit and receive RF waveforms in the quasi-licensed portion; digital processor apparatus in data communication with the wireless interface; and a storage device in data communication with the digital processor apparatus and comprising at least one computer program.

In one variant, the node comprises a Category B CBSD that also includes a 3GPP 4G/4.5/5G protocol stack.

In another variant, the at least one computer program is configured to, when executed by the digital processor apparatus: receive a first protocol message from a computerized network node, the first protocol message including a first information element (IE) to the wireless access point specifying (i) a selected new RF carrier and (ii) a timer value, the message causing the wireless access apparatus to use the selected new RF carrier after the timer value expires.

In another aspect of the disclosure, network apparatus for use within a first network is disclosed. In one embodiment, the network apparatus is configured to generate messaging to one or more attached devices regarding RF carrier migration/reassignment plans, and includes: digital processor apparatus; network interface apparatus in data communication with the digital processor apparatus and configured to transact data with the one or more attached devices; and a storage apparatus in data communication with the digital processor apparatus and comprising at least one computer program.

In a further aspect of the disclosure, a fixed wireless access (FWA) apparatus for use within a wireless network is disclosed. In one embodiment, the FWA apparatus comprises a premises device operated by a network operator (e.g., MSO) that is configured to communicate wirelessly with one or more CBSD/xNB devices to obtain wireless backhaul from the premises. In one variant, the FWA apparatus is configured as a Category B CBSD CBRS device, and is mounted on the user's premises so as to enable the aforementioned backhaul for WLAN or wireline interfaces within the premises.

In a further aspect, a method of operating a wireless access point is disclosed. Inone embodiment, the method includes: based at least on a determination that at least one RF (radio frequency) carrier in use by the wireless access point requires reassignment, generating a first information element (IE) comprising: (i) data relating to a selected new RF carrier, and (ii) a temporal value; transmitting the first IE to a wireless device associated with the wireless access point; causing transition of operation of the wireless access point to the selected new RF carrier; and subsequent to the transition and after expiration of the temporal value, establishing wireless data communication between the wireless device and the wireless access point using the selected new RF carrier.

In another aspect, a computer readable apparatus having a storage medium is disclosed. In one embodiment, the storage medium includes at least one computer program having a plurality of instructions which are configured to, when executed on a computerized wireless access device with digital processor apparatus, cause the computerized wireless access device to: generate, based at least on a determination that at least one RF (radio frequency) carrier in use by the computerized wireless access device as part of a communication session with a wireless user device requires reassignment, a first information element (IE) comprising: (i) data relating to a selected new RF carrier, and (ii) reattachment criterion data; transmit the first IE to the wireless user device using the at least one RF carrier, the transmitted first IE configured to cause transition of operation of the wireless user device to the selected new RF carrier; and receive a reattachment request form the wireless user device via at least the selected new carrier, the reattachment request having been transmitted from the wireless user device after at least one criterion specified by the reattachment criterion data has been met; and based at least on the received reattachment request, establish wireless data communication between the wireless user device and the computerized wireless access device using the selected new RF carrier.

In yet another aspect, a computerized wireless-enabled user device configured for quasi-licensed band operation is disclosed. In one embodiment, the computerized wireless-enabled user device includes: a first wireless data interface configured to utilize at least quasi-licensed radio frequency (RF) spectrum; digital processor apparatus in data communication with the first wireless data interface; and a storage device in data communication with the digital processor apparatus and comprising at least one computer program.

In one variant, the at least one computer program includes a plurality of instructions which are configured to, when executed by the digital processor apparatus, cause the computerized wireless-enabled user device to: receive data from a wireless base station via at least a first RF carrier within the quasi-licensed RF spectrum and a communications session between at least the wireless base station and the computerized wireless-enabled user device, the received data comprising at least (i) first data relating to a new RF carrier assignment, and (ii) data relating to a protocol to be utilized in attempt of at least one subsequent re-attachment to the wireless base station by the computerized wireless enabled user device; and based at least on the received data, perform a truncated re-attachment procedure according to the protocol while maintaining the communications session.

In an additional aspect of the disclosure, computer readable apparatus is described. In one embodiment, the apparatus includes a storage medium configured to store one or more computer programs. In one embodiment, the apparatus includes a program memory or HDD or SDD on a computerized controller device, such as an MSO controller, DP, or SAS entity. In another embodiment, the apparatus includes a program memory, HDD or SSD on a computerized access node (e.g., CBSD/xNB or CPE).

In a further aspect, a system architecture for reassignment of unlicensed or quasi-licensed spectrum among a plurality of CBSD/xNB (and associated CPE) is disclosed.

These and other aspects shall become apparent when considered in light of the disclosure provided herein.

BRIEF DESCRIPTION OF THE DRAWINGS

FIG. 2a is a graphical representation of allocations for PAL versus GAA users within the frequency band of FIG. 2.

FIG. 5a is a ladder diagram illustrating the communication flow for quasi-licensed band frequency reassignment transitions in accordance with the method of FIG. 5.

Figure 1:
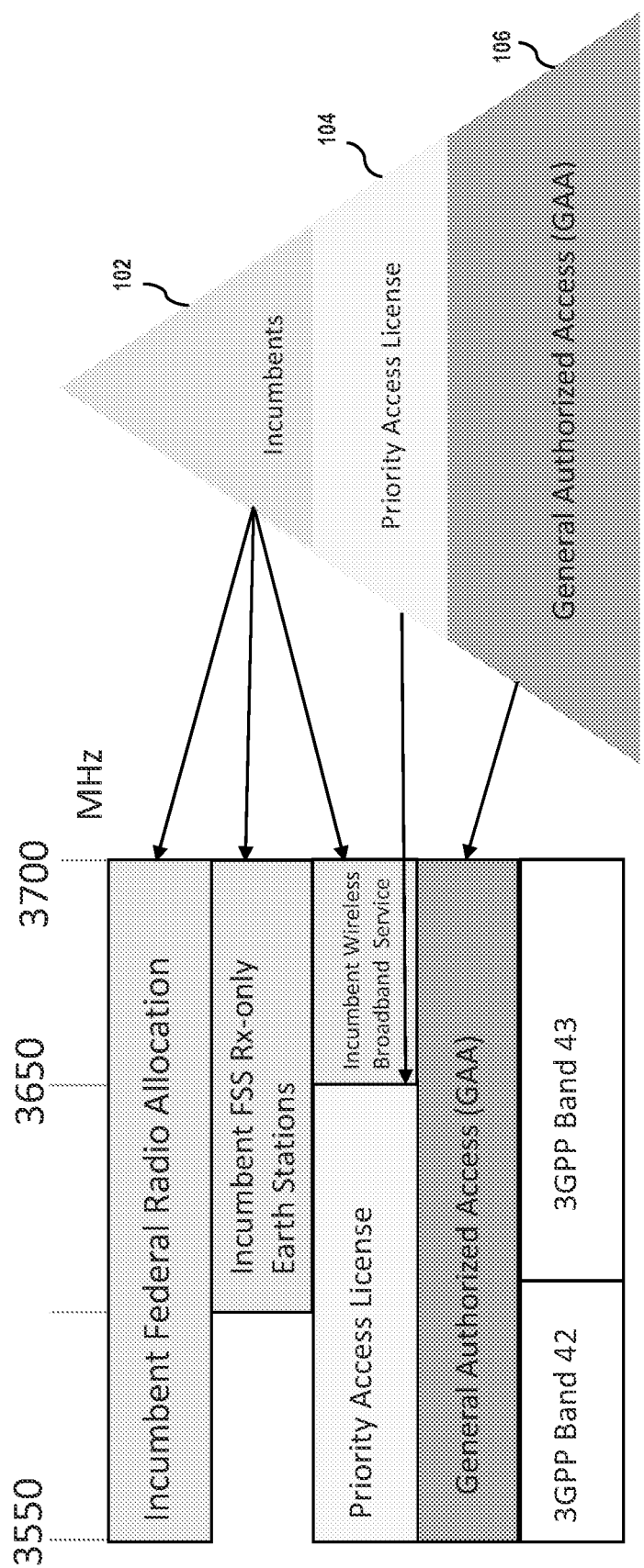
FIG. 1 is a graphical illustration of prior art CBRS (Citizens Broadband Radio Service) users and their relationship to allocated frequency spectrum in the 3.550 to 3.700 GHz band.

All figures © Copyright 2017-2019 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, January 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one exemplary aspect, the present disclosure provides improved methods and apparatus for reassignment or re-allocation of wireless spectrum, such as "quasi-licensed" spectrum such as that provided by the recent CBRS technology initiatives (e.g., GAA or General Authorized Access) spectrum as shown in FIG. 1 herein.

In an exemplary embodiment, a CPE (e.g., Category B device) and CBSD/xNB architecture is provided which allows, inter alia, passing of data on frequency reassignments (such as due to a SAS withdraw or grant revocation of a current allocated frequency band) to an attached CPE so as to minimize disruption or loss of continuity to existing data sessions of the CPE and its constituent user devices, such as e.g., ongoing VoIP or VoLTE voice data sessions. In one variant, the CBSD/xNB undergoing frequency reassignment notifies the relevant attached CPE (which may be one or more CPE) of the impending frequency change to a target frequency (e.g., F1) as well as a timer value of how long it will be off-line to effect the carrier change. The CPE use(s) this information to, among other things, (i) wait only as long as needed for the CBSD/xNB to switch frequencies, and (ii) obviate a full band-scan to detect the CBSD/xNB at the new frequency. The CPE's use of this specific frequency when performing registration with SAS also may decrease the SAS grant time response.

As such, the CBSD/xNB acts as a "SAS proxy" of sorts for the CPE (and vice versa), providing communication between the two entities in instances such as frequency withdrawals/reassignments.

Advantageously, exemplary embodiments of the methods and apparatus described herein utilize existing 3GPP signaling mechanisms between, inter alia, the UE and CPE (including EUTRAN eNodeB or 5G NR gNodeB functionality), thereby obviating any changes to extant UEs in use. This is accomplished by maintaining two technology "stacks" in the CPE (i.e., a CBRS-compliant stack, and a 3GPP-compliant eNB or gNB stack for communication with 4G or 5G UEs respectively. CBRS-plane communications (e.g., between the CPE and its parent CBSD) include new information elements (IEs) or objects which, inter alia, direct the CPE to invoke both the aforementioned wait period, and the "targeted" carrier reattach procedure with the CBSD/xNB after frequency migration.

Detailed Description of Exemplary Embodiments

Exemplary embodiments of the apparatus and methods of the present disclosure are now described in detail. While these exemplary embodiments are described in the context of the previously mentioned wireless access points (e.g., CBSDs) associated with e.g., a managed network (e.g., hybrid fiber coax (HFC) cable architecture having a multiple systems operator (MSO), digital networking capability, IP delivery capability, and a plurality of client devices), the general principles and advantages of the disclosure may be extended to other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible. Also, while certain aspects are described primarily in the context of the well-known Internet Protocol (described in, inter alia, Internet Protocol DARPA Internet Program Protocol Specification, IETF RCF 791 (September 1981) and Deering et al., Internet Protocol, Version 6 (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Moreover, while the current SAS framework is configured to allocate spectrum in the 3.5 GHz band (specifically 3,550 to 3,700 MHz), it will be appreciated by those of ordinary skill when provided the present disclosure that the methods and apparatus described herein may be configured to utilize other "quasi licensed" or other spectrum, including without limitations above 4.0 GHz (e.g., currently proposed allocations up to 4.2 GHz).

Additionally, while described primarily in terms of GAA 106 spectrum allocation (see FIG. 1), the methods and apparatus described herein may also be adapted for allocation of other "tiers" of CBRS or other unlicensed spectrum (whether in relation to GAA spectrum, or independently), including without limitation e.g., so-called Priority Access License (PAL) spectrum 104.

Moreover, while described in the context of quasi-licensed or unlicensed spectrum, it will be appreciated by those of ordinary skill given the present disclosure that various of the methods and apparatus described herein may be applied to reallocation/reassignment of spectrum or bandwidth within a licensed spectrum context; e.g., for cellular voice or data bandwidth/spectrum allocation, such as in cases where a given service provider must alter its current allocation of available spectrum to users.

Moreover, while various aspects of the present disclosure are described in detail with respect to so-called "4G/4.5G" 3GPP Standards (aka LTE/LTE-A), such aspects—including allocation/use/withdrawal of CBRS spectrum—are generally access technology "agnostic" and hence may be used across different access technologies, including so-called 5G "New Radio" (3GPP Release 15 and TS 38.XXX Series Standards and beyond).

Other features and advantages of the present disclosure will immediately be recognized by persons of ordinary skill in the art with reference to the attached drawings and detailed description of exemplary embodiments as given below.

Service Provider Network—

Figure 3A:
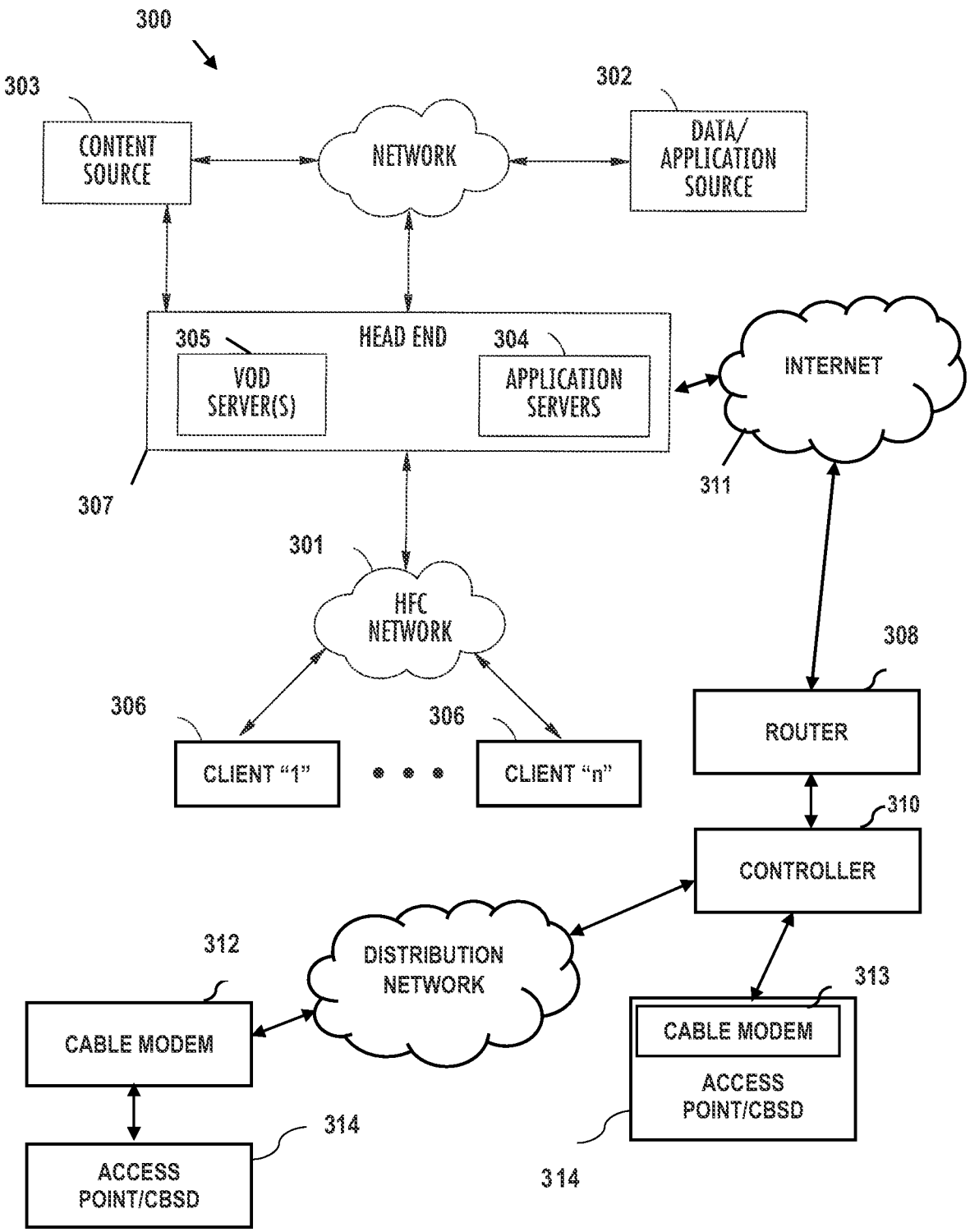
FIG. 3a is a functional block diagram illustrating an exemplary hybrid fiber network configuration useful with various aspects of the present disclosure.

FIG. 3a illustrates a typical service provider network configuration useful with the spectrum re-assignment functionality and supporting CBRS-based wireless network(s) described herein. It will be appreciated that while described with respect to such network configuration, the spectrum reassignment methods and apparatus described herein may readily be used with other network types and topologies, whether wired or wireless, managed or unmanaged.

The exemplary service provider network 300 is used in one embodiment of the disclosure to provide backbone and Internet access from the service provider's wireless access nodes (e.g., CBSDs, Wi-Fi APs, FWA devices or base stations 314 operated or maintained by the service provider or its customers/subscribers), one or more stand-alone or embedded cable modems (CMs) 312, 313 in data communication therewith, or even third party access points accessible to the service provider via, e.g., an interposed network such as the Internet 311 (e.g., with appropriate permissions from the access node owner/operator/user). As discussed in greater detail elsewhere herein, the exemplary enhanced CBSD/xNB nodes 314 include the capability of communication with served nodes such as the enhanced CPE 324 discussed infra for, inter alia, more efficient and seamless frequency re-allocations from SAS so as to preserve end-user experience.

As described in greater detail subsequently herein with respect to FIG. 4a, one or more controllers 310 are optionally utilized for, inter alia, control of the wireless network access nodes 314 at least partly by the MSO. As opposed to an unmanaged network, the managed service-provider network 300 of FIG. 3a advantageously allows, inter alia, control and management of a given user's access (such user which may be a network subscriber, or merely an incidental/opportunistic user of the service) via the wireless access node(s) 314, including imposition and/or reconfiguration of various access "rules" or other configurations applied to the wireless access nodes, as well as assisting in "seamless" handovers invoked by the cognizant SAS. For example, the service provider network 300 allows components at a venue of interest (e.g., CBSDs, Wi-Fi APs and any supporting infrastructure such as routers, switches, etc.) to be remotely reconfigured by the network MSO, based on e.g., prevailing operational conditions in the network, changes in user population and/or makeup of users at the venue, business models (e.g., to maximize profitability or provide other benefits such as enhanced user experience, as described infra), spectrum channel changes or withdrawals by the SAS (see FIGS. 5 and 6), or even simply to enhance user experience using one RAT (e.g., CBRS) when another RAT (e.g., WLAN is sub-optimal for whatever reason). It also permits communication of data from the CBSDs backwards towards the controller, including configuration and demand data relating to the individual CBSDs for purposes of facilitating seamless handover.

In certain embodiments, the service provider network 300 also advantageously permits the aggregation and/or analysis of subscriber- or account-specific data (including inter alia, particular mobile devices associated with such subscriber or accounts) as part of the provision of services to users under the exemplary delivery models described herein. As but one example, device-specific IDs (e.g., MAC address or the like) can be cross-correlated to MSO subscriber data maintained at e.g., the network head end(s) 307 so as to permit or at least facilitate, among other things, (i) user authentication; (ii) correlation of aspects use cases or applications to particular subscriber demographics, such as for delivery of targeted advertising; and (iii) determination of subscription level, and hence subscriber privileges and access to content/features. Moreover, device profiles for particular user devices can be maintained by the MSO, such that the MSO (or its automated proxy processes) can model the user device for wireless capabilities.

The CBSD/xNB wireless access nodes 314 disposed at the service location(s) (e.g., areas or venue(s) of interest) can be coupled to the bearer managed network 300 (FIG. 3a) via, e.g., a cable modem termination system (CMTS) and associated local DOCSIS cable modem (CM) 312, 313, a wireless bearer medium (e.g., an 802.16 WiMAX or millimeter wave system—not shown), a fiber-based system such as FiOS or similar, a third-party medium which the managed network operator has access to (which may include any of the foregoing), or yet other means.

The various components of the exemplary embodiment of the network 300 generally include (i) one or more data and application origination sources 302; (ii) one or more content sources 303, (iii) one or more application distribution servers 304; (iv) one or more video-on-demand (VOD) servers 305, (v) client devices 306, (vi) one or more routers 308, (vii) one or more wireless access node controllers 310 (may be placed more locally as shown or in the headend or "core" portion of network), (viii) one or more cable modems 312, 313, and/or (ix) one or more access nodes 314 (which may include 3GPP-compliant EUTRAN eNodeB functionality as described elsewhere herein). The application server(s) 304, VOD servers 305 and client device(s) 306 are connected via a bearer (e.g., HFC) network 301. A simple architecture comprising one of each of certain components 302, 303, 304, 305, 308, 310 is shown in FIG. 3a for simplicity, although it will be recognized that comparable architectures with multiple origination sources, distribution servers, VOD servers, controllers, and/or client devices (as well as different network topologies) may be utilized consistent with the present disclosure.

It is also noted that cable network architecture is typically a "tree-and-branch" structure, and hence multiple tiered CBSD/xNB access nodes 314 (and other components) may be linked to each other or cascaded via such structure.

Figure 3B:
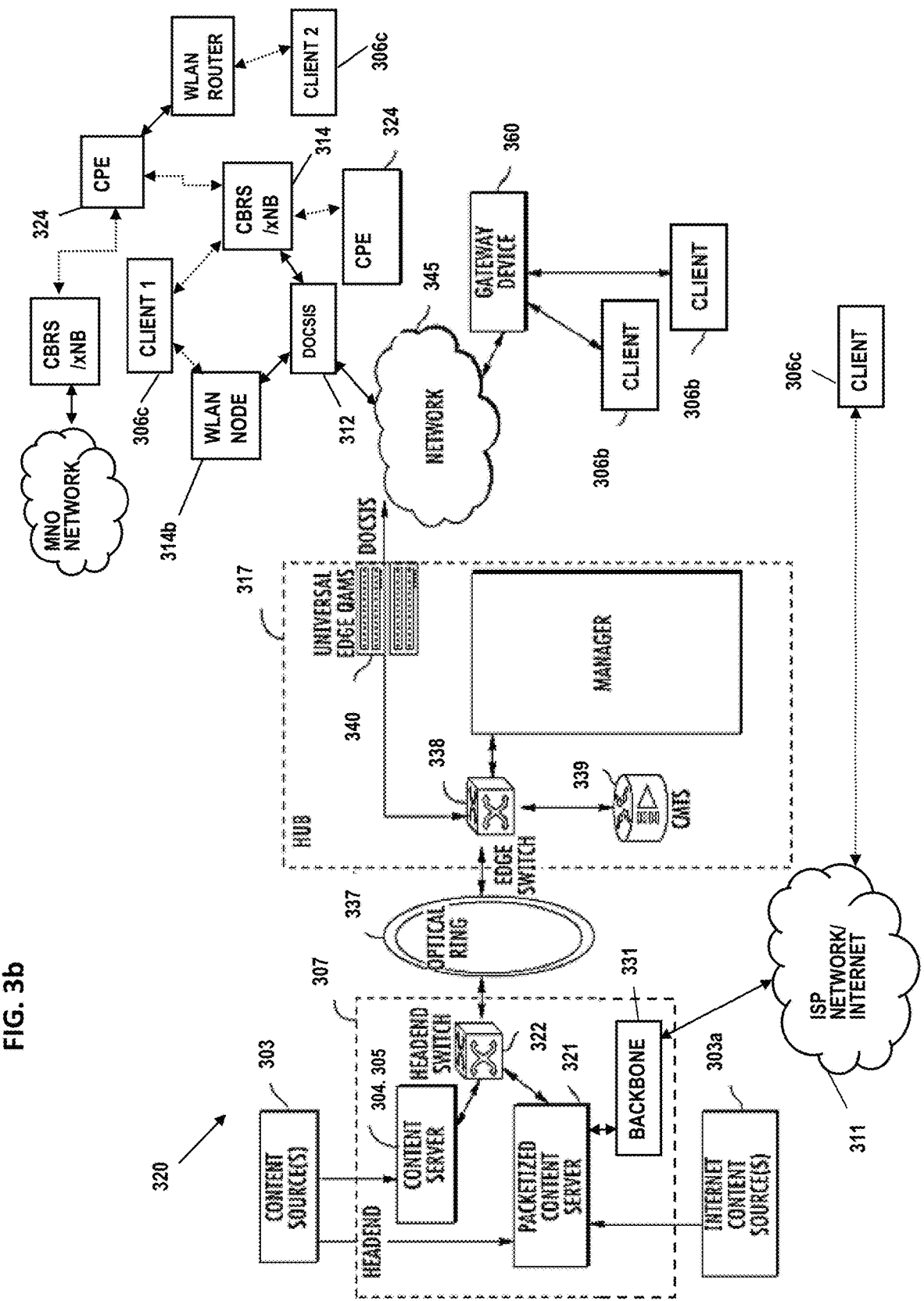
FIG. 3b is a functional block diagram of an exemplary packetized content network architecture useful in conjunction with various principles described herein.

FIG. 3b illustrates an exemplary high-level MSO network architecture for the delivery of packetized content (e.g., encoded digital content carried within a packet or frame structure or protocol) that may be useful with the various aspects of the present disclosure. In addition to on-demand and broadcast content (e.g., live video programming), the system of FIG. 3b may deliver Internet data and OTT (over-the-top) services to the end users (including those of the access nodes 314) via the Internet protocol (IP) and TCP, although other protocols and transport mechanisms of the type well known in the digital communication art may be substituted.

The network architecture 320 of FIG. 3b generally includes one or more headends 307 in communication with at least one hub 317 via an optical ring 337. The distribution hub 317 is able to provide content to various user/client devices 306, and gateway devices 360 as applicable, via an interposed network infrastructure 345. The illustrated CPE 324 may also include Fixed Wireless Access (FWA) applications of CBRS, whether alone or in tandem with other types of installations or applications. In FWA, the CBSD/xNB typically communicates wirelessly with a Customer Premises Equipment (CPE) mounted on the customer's house or office (e.g., mounted rooftop, on a pole, etc.). The CPE is then placed in wireline communication (e.g., via CAT-5 or -6 or other cabling) to an in-premises router, the router providing WLAN (e.g., Wi-Fi) coverage within the premises. The customers may be connected to the CBSD/xNB backhaul via the router and the CPE such as by using their WLAN-enabled smart phones/tablets/laptops. Direct Ethernet connection may also be utilized, such as for the customer's tower or desktop PC.

Various content sources 303, 303a are used to provide content to content servers 304, 305 and origin servers 321. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 303a (such as e.g., a web server) provide Internet content to a packetized content origin server(s) 321. Other IP content may also be received at the origin server(s) 321, such as voice over IP (VoIP) and/or IPTV content. Content may also be received from subscriber and non-subscriber devices (e.g., a PC or smartphone-originated user made video).

The centralized media server(s) 321, 304 located in the headend 307 may also be replaced with or used in tandem with (e.g., as a backup) to hub media servers (not shown) in one alternative configuration. By distributing the servers to the hub stations 317, the size of the fiber transport network associated with delivering VOD services from the central headend media server is advantageously reduced. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, etc., subscriber CPE-based session requests (e.g., from a user's DSTB or the like), while a different configuration or architecture may be used for servicing mobile client requests. Similarly, the content servers 321, 304 may either be single-purpose/dedicated (e.g., where a given server is dedicated only to servicing certain types of requests), or alternatively multipurpose (e.g., where a given server is capable of servicing requests from different sources).

The network architecture 320 of FIG. 3b may further include a legacy multiplexer/encrypter/modulator (MEM; not shown). In the present context, the content server 304 and packetized content server 321 may be coupled via a LAN to a headend switching device 322 such as an 802.3z Gigabit Ethernet (or "10G") device. For downstream delivery via the MSO infrastructure (i.e., QAMs), video and audio content is multiplexed at the headend 307 and transmitted to the edge switch device 338 (which may also comprise an 802.3z Gigabit Ethernet device) via the optical ring 337.

In one exemplary content delivery paradigm, MPEG-based video content (e.g., MPEG-2, H.264/AVC) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOCSIS QAMs to the user's PC or other IP-enabled device via the user's cable modem 312 (including to end users of the CBSD/xNB access node 314). Delivery in such packetized modes may be unicast, multicast, or broadcast.

Delivery of the IP-encapsulated data may also occur over the non-DOCSIS QAMs, such as via IPTV or similar models with QoS applied.

Individual client devices such as cable modems 312 and associated end-user devices 306a, 306b of the implementation of FIG. 3b may be configured to monitor the particular assigned RF channel (such as via a port or socket ID/address, or other such mechanism) for IP packets intended for the subscriber premises/address that they serve. The IP packets associated with Internet services are received by edge switch, and forwarded to the cable modem termination system (CMTS) 339. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the "in band" RF channels used for the broadcast video and audio programming, although this is not a requirement. As noted above, the premises devices such as cable modems 312 are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 340. According to this embodiment, all of the content is delivered on DOCSIS channels, which are received by a premises gateway 360 or cable modem 312, and distributed to one or more respective client devices/UEs 306a, 306b, 306c in communication therewith.

In one implementation, the CM 312 shown in FIG. 3b services an area which may includes a venue, such as an apartment building, conference center or hospitality structure (e.g., hotel) or other such premises. In parallel (or in the alternative), the premises includes one or more CPE nodes 324 for CBRS-band (3.5 GHz) access, and a WLAN (e.g., Wi-Fi) node 314b for WLAN access (e.g., within 2.4 GHz ISM band). As previously described, the CPE 324 may also provide connectivity for a WLAN router as shown (acting as an FWA device), which provides e.g., Wi-Fi access for users at the premises. The CPE 324 may also communicate wirelessly with non-MSO CBSD/xNB devices operated by e.g., an MNO for backhaul via that MNO's infrastructure, as shown at the top of FIG. 3b. Notably, in some configurations, the client devices 306c communicating with the access nodes 314a, 314b, as described in greater detail subsequently herein, can utilize either RAT (CBRS/3GPP with the CPE 324 or WLAN). In one variant, this selective utilization may depend on, inter alia, directives received from the MSO controller 310 (FIG. 3a) via one access node 314 or the other, or even indigenous logic on the client device 306c enabling it to selectively access one RAT or the other. Feasibly, both RATs could operate in tandem, since they utilize different frequencies, modulation techniques, interference mitigation techniques, Tx power, etc.

In parallel with (or in place of) the foregoing delivery mechanisms, the MSO backbone 331 and other network components can be used to deliver packetized content to the user's mobile client device 306c via non-MSO networks. For example, so-called "OTT" content (whether tightly coupled or otherwise) can be ingested, stored within the MSO's network infrastructure, and delivered to the user's mobile device via an interposed ISP (Internet Service Provider) network and public Internet 311 (e.g., at a local coffee shop, via a Wi-Fi AP connected to the coffee shop's ISP via a modem, with the user's IP-enabled end-user device 306c utilizing an Internet browser or MSO/third-party app to stream content according to an HTTP-based approach).

Wireless Services Architecture—

Figure 4A:
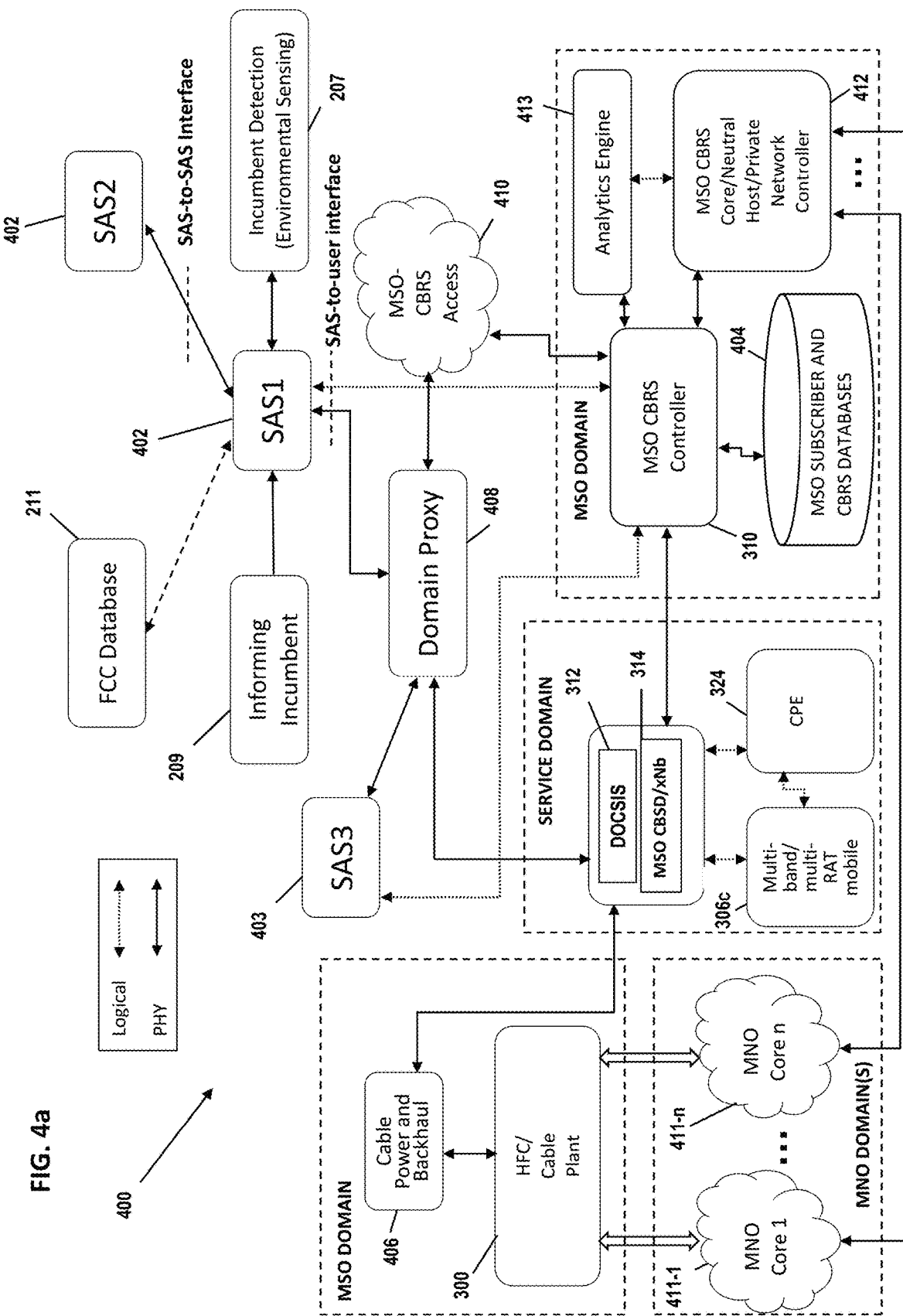
FIG. 4a is a functional block diagram of a first exemplary embodiment of a quasi-licensed wireless network infrastructure useful with various aspects of the present disclosure.

FIG. 4a illustrates an exemplary embodiment of a network architecture 400 useful in implementing the "seamless" reassignment of CBRS-based wireless frequencies according to the present disclosure. As used in the present context, the term "users" may include without limitation end users (e.g., individuals, whether subscribers of the MSO network, the MNO network, or other), additional distribution equipment or infrastructure such as CPE 324, venue operators, third party service providers, or even entities within the MSO itself (e.g., a particular department, system or processing entity).

It will be appreciated that while described primarily in terms of CBSD/xNBs 314 which also include EUTRAN (3GPP) compliant eNodeB and/or gNodeB functionality, the latter is by no means of requirement of practicing the broader features of the invention, and in fact non-3GPP signaling and protocols may be utilized to support the various functions described herein. Due to its current ubiquity (especially in mobile devices or UEs), however, the extant 3GPP protocols provide a convenient and effective platform which can be leveraged for CBRS-based operation.

As shown, the illustrated embodiment of the architecture may generally include if desired an MSO-maintained CBRS controller 310 (which may be disposed remotely at the backend or headend of the system within the MSO domain as shown or at the served venue, or at an intermediary site), a CBRS Core/Neutral Host/Private Network Controller 413, an analytics engine 413 in data communication with the CBRS controller 310, an MSO-maintained subscriber and CBRS database 404, one or more CBSD/xNB access nodes 314 in data communication with the CBRS controller 310 (e.g., via existing network architectures including any wired or wireless connection), as well as any number of client devices 306c (smartphones, laptops, tablets, watches, vehicles, etc.). The CBSD/xNB 314 includes in the illustrated embodiment an embedded cable modem 312 used for communication with a corresponding CMTS 339 (FIG. 3b) within the MSO's (e.g., cable) plant 300 via cable power and backhaul infrastructure 406, including high-data bandwidth connections to the MSO's backbone 331, and electrical power for the CBSD/xNB. A MNO (mobile network operator) network 411 also may communicate with the MSO network via the backhaul 406, such as for inter-operator communications regarding common users/subscribers.

As described subsequently herein, the presence of the MSO controller 310 and analytics engine 413 is optional for purposes of implementing the frequency reassignment methodologies and functions described herein; notably, certain embodiments utilize direct communication between the cognizant SAS (or DP) and the target CBSDs/xNBs, with no need for controller support. However, certain analytics and control functions may be performed by the MSO controller 310 and associated analytics engine in support of efficient frequency management and utilization (including mitigation of session disruption due to e.g., SAS-initiated spectrum withdrawals), depending on inter alia, the degree of integration between the cognizant SAS/DP and the MSO desired. For example, in one implementation, certain sets of rules or priorities may be implemented at the MSO level via logic on the controller 310 and analytics engine 413 which are not visible to the SAS (the SAS being largely agnostic to particulars of each MSO/MNO domain which it serves). As such, the SAS (or DP) may provide the MSO domain with higher-level instructions or directives on frequency/carrier use, reclamation, time periods, etc., and effectively let the MSO domain decide how to execute the process consistent with those instructions or directives.

Likewise, the controller 310 and associated logic can act merely as a passive monitor of the transactions between the SAS/DP and relevant target CBSDs/xNBs (and CPE 324), so as to maintain accurate accounting of user/frequency/CBSD mapping (i.e., which UE is using what frequencies via what CPE and/or CBSD/xNB at any given time, as well as which CPE 324 are utilizing what frequencies for communication with which CBSD/xNBs 314), without actively participating in the reassignment process.

As shown in FIG. 4a, in operation, the Domain Proxy (DP) 408 is in logical communication with the CBSD/xNB disposed at the venue (either directly, as shown, or via MSO backend network infrastructure) and the MSO CBRS controller 310 (if present). The DP 408 provides, inter alia, SAS interface for the CBSD/xNB, including directive translation between CBSD/xNB 314 and SAS commands, bulk CBSD/xNB directive processing, and interference contribution reporting to the SAS (i.e., to help an SAS tune or update its predictive propagation models and detect realistic interference issues once CBSDs/xNBs are deployed, the CBSDs/xNBs and even attached CPE 324 can provide signal strength and interference level measurements).

The MSO controller 310 in the illustrated embodiment communicates with the DP 208 via an MSO CBRS access network 410, which may be a public internetwork (e.g., the Internet), private network, or other, depending on any security and reliability requirements mandated by the MSO and/or SAS.

As used herein, a CBRS "domain" is defined is any collection of CBSDs/xNBs 314 that are or need to be grouped for management, whether logically or by other scheme; e.g.: according to network operator (NO), according to a serving SAS vendor, and/or by physical disposition (e.g., within a large enterprise, venues, certain geographic area, etc.) In the embodiment of FIG. 4a, the DP 408 aggregate control information flows to the SAS1 402 and/or any participating other SAS (SAS2), which may be e.g., a Commercial SAS (CSAS)) 403, and generates performance reports, channel requests, heartbeats, and other types of data, including data necessary for operation of the spectrum allocation and reassignment algorithms described in greater detail subsequently herein. In the illustrated embodiment, the DP 408 is operated by a third-party service provider, although it will be appreciated that the MSO may operate and maintain the DP 408, and or operate/maintain its own internal DP, such as for channel request processing, aggregation, reporting, and other of the above-listed functions for the MSO's internal CBRS domains, for interface with an external DP 408.

Figure 4B:
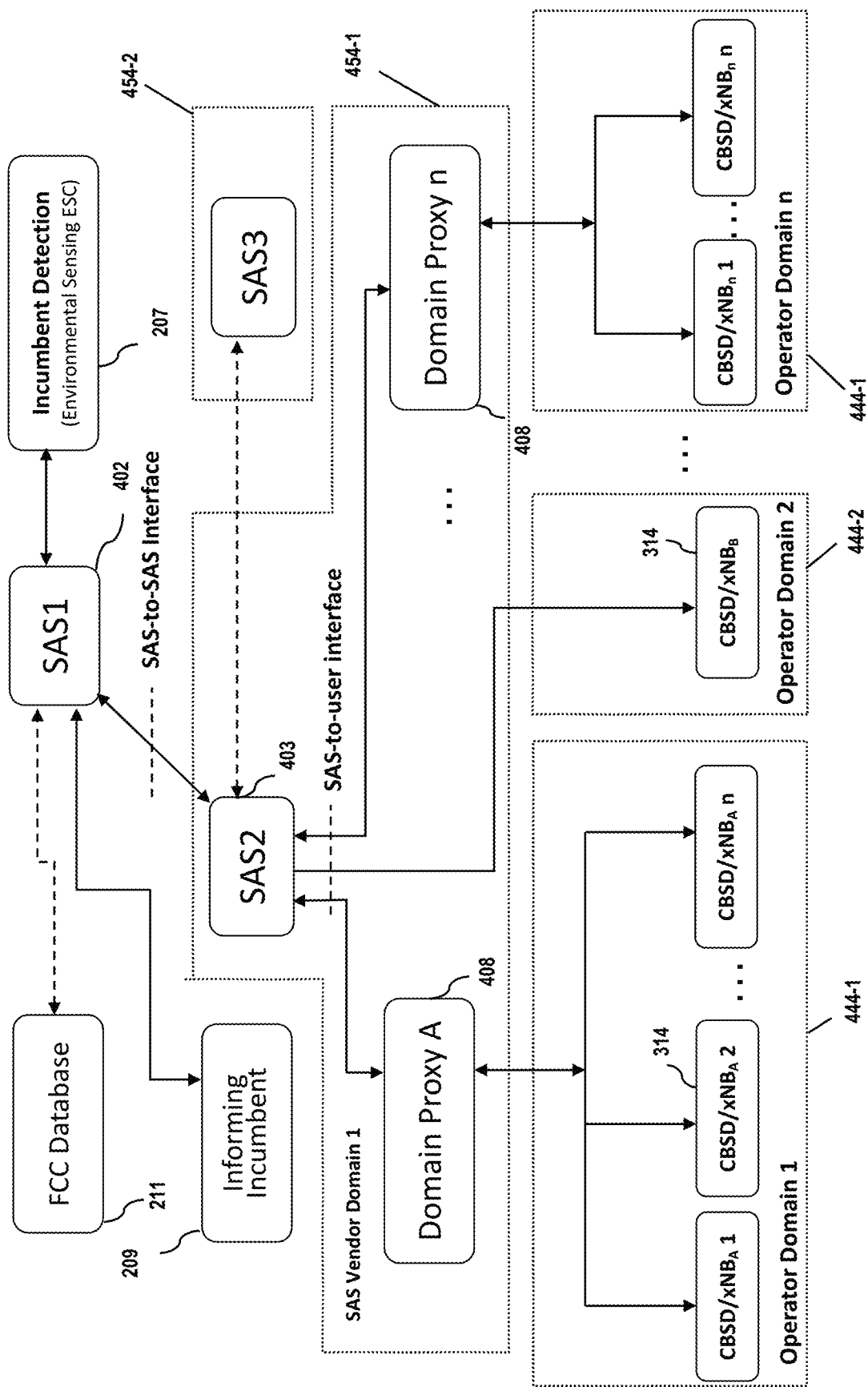
FIG. 4b is a functional block diagram of a first exemplary embodiment of a quasi-licensed wireless network architecture useful with various aspects of the present disclosure, including operator domains and SAS vendor domains.
Figure 4C:
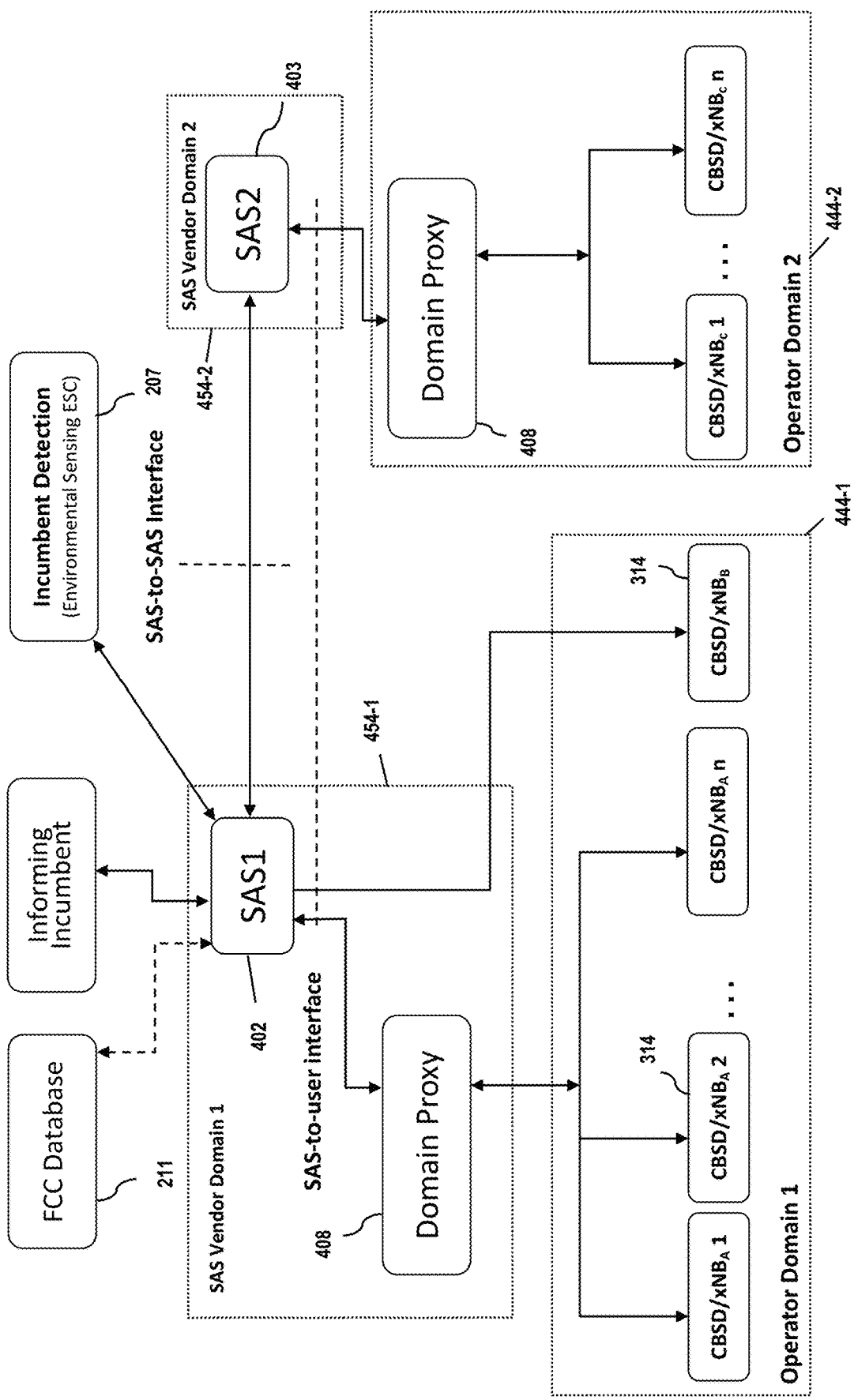
FIG. 4c is a functional block diagram of a second exemplary embodiment of a quasi-licensed wireless network architecture useful with various aspects of the present disclosure, including operator domains and SAS vendor domains.

FIGS. 4b and 4c illustrate exemplary alternate configurations of SAS1 402, SAS2 403, and DPs 408 useful with the various embodiments of the frequency reassignment methodologies and apparatus described herein. It will be appreciated that these configurations are intended merely to illustrate operation of the aforementioned reassignment methods and apparatus of the present disclosure, and should in no way be considered limiting. Adaptation of the methods and apparatus described herein to yet other types of configurations can be accomplished by those of ordinary skill when provided the present disclosure.

As shown in FIG. 4b, multiple operator domains 444 are serviced by respective CBSDs/xNBs 314. Two domains 444-1 of the three operator domains are served by respective DPs 408 within a first SAS vendor domain 454-1. The two DPs 408 are served by a common SAS (SAS2 403), which interfaces with the SAS1 402 outside the domain 454-1 as illustrated. The third operator domain 444-2 is directly served by the SAS3 403, with no DP (e.g., this domain 444-2 may for example include its own internal DP, or has otherwise obviated the functions thereof).

Referring now to FIG. 4c, multiple operator domains 444 are again serviced by respective CBSDs/xNBs 314. One of the two operator domains 444-1 are served by respective DPs 408 within respective SAS vendor domains 454-1 and 454-2. The two DPs 408 are served by different SAS; e.g., SAS1 402 for the first domain 454-1, which interfaces with incumbent detection apparatus 207 and the FCC database 211 (as well as informing incumbents) as illustrated. The second operator domain 444-2 and its DP 408 are served by SAS2 403 within vendor domain 454-2.

Returning again to FIG. 4a, the MSO subscriber and CBRS database 404 includes several types of data useful in operation of the system 400. As part thereof, the MSO database 404 includes data relating to, among other things: (i) CBSD/xNB and/or CPE identification (e.g., MAC), (ii) CBSD/xNB and/or CPE location, (iii) association with parent or child nodes or networks (if any) including CPE 324, and (iv) CBRS/xNB and CPE configuration and capabilities data. The CBRS database 404 may also include MSO-maintained data on spectrum usage and historical patterns, channel withdrawals, and other data which enable the MSO to proactively "plan" channel usage and re-assignment within the venue(s) of interest where the CBSD/xNB(s) 314 and associated CPE 324 operate in certain embodiments herein.

In certain embodiments, each CPE 324 is located within and/or services one or more areas within one or more venues (e.g., a building, room, or plaza for commercial, corporate, academic purposes, and/or any other space suitable for wireless access). Each CBSD/xNB 324 is configured to provide wireless network coverage within its coverage or connectivity range. For example, a venue may have a wireless modem installed within the entrance thereof for prospective customers to connect to, including those in the parking lot via inter alia, their LTE-enabled vehicles or personal devices of operators thereof. Notably, different classes of CPE 324 and CBSD/xNB 314 may be utilized. For instance, as previously noted, Category A devices can transmit up 30 dbm (1 watt), while Category B devices can transmit up to approximately 50 dbm, so the average area can vary widely. In practical terms, a Category A device may have a working range on the order of hundreds of feet, while a Category B device may operate out to thousands of feet or more, the propagation and working range dictated by a number of factors, including the presence of RF or other interferers, physical topology of the venue/area, energy detection or sensitivity of the receiver, etc.

In the exemplary embodiment, one or more CBSDs/xNBs 314 may be indirectly controlled by the CBRS controller 310 (i.e., via infrastructure of the MSO network), or directly controlled by a local or "client" CBRS controller disposed at the venue (not shown). Various combinations of the foregoing direct and indirect control may be implemented within the architecture 400 of FIG. 4a as desired. The controller 310 is implemented in this instance as a substantially unified logical and physical apparatus maintained within the MSO domain, such as at an MSO headend or hubsite, and in communication with the MNO core 411 via the MSO core function 412. The controller 310 also optionally includes algorithms to optimize operation of the "local" CBRS network maintained by the MSO, such as within a target venue or area, when supporting operation of the SAS/DP inter-cell handover procedures (e.g., where the MSO controller is tasked with generating a migration plan, as described in greater detail below). These optimizations may include for example: (a) utilization of the environmental interference data to characterize the CBRS band(s) of the venue/area; (b) use the characterization of (a) to structure migration plans for frequency reassignment within the CBRS band(s) to the DP/SAS (e.g., which will mitigate interference or contention/collisions within the venue/are in those bands); (c) use the interference data and other relevant data (e.g., attendance, time, interference/signal as a function of CBSD/xNB location, etc.) to build historical profiles of spectrum use a function of various variables, including profiles particular to the venue/area itself, as described in co-pending U.S. patent application Ser. No. 15/612,630 filed Jun. 2, 2017 entitled "APPARATUS AND METHODS FOR PROVIDING WIRELESS SERVICE IN A VENUE," incorporated herein by reference in its entirety; (d) utilize data regarding spectrum availability withdrawals (e.g., where DoD assets require use of a previously allocated band) and other events to generate predictive or speculative models on CBRS band utilization as a function of time, including in support of migration plans.

Methods—

Figure 5:
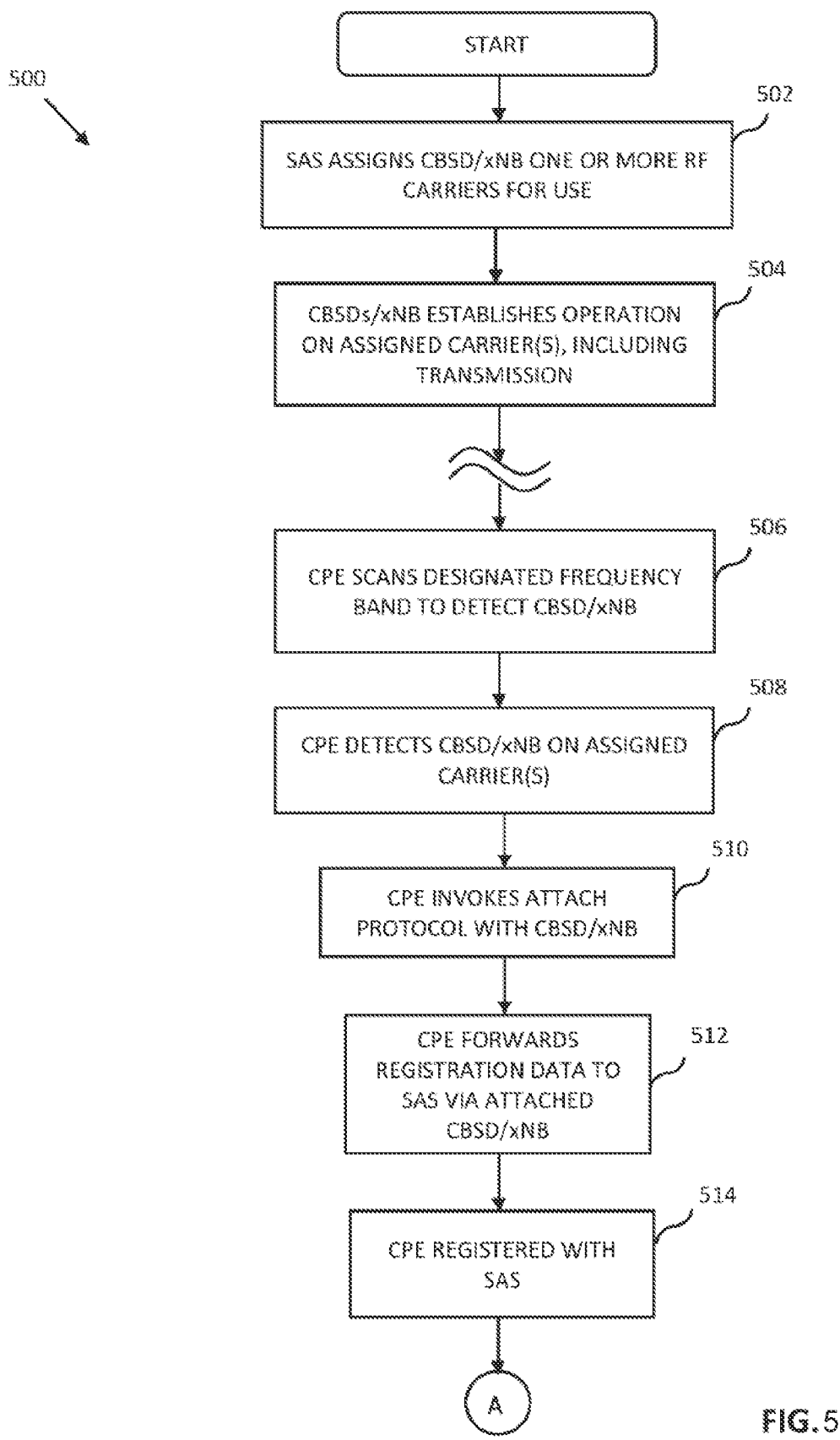
FIG. 5 is logical flow diagram of an exemplary method for providing quasi-licensed band spectrum (e.g., CBRS GAA) frequency reassignments according to the present disclosure.
Figure 5:
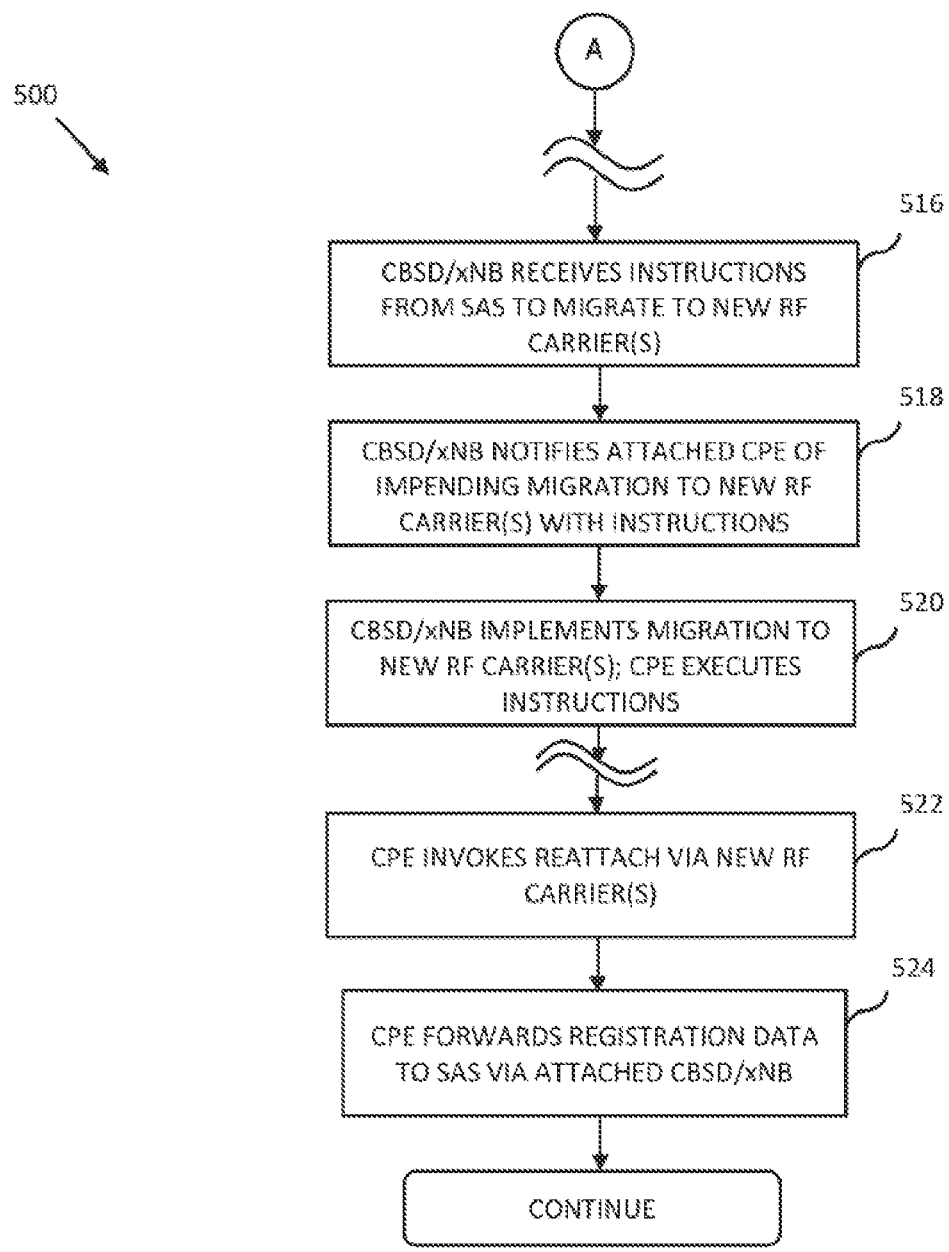
Figure 6:
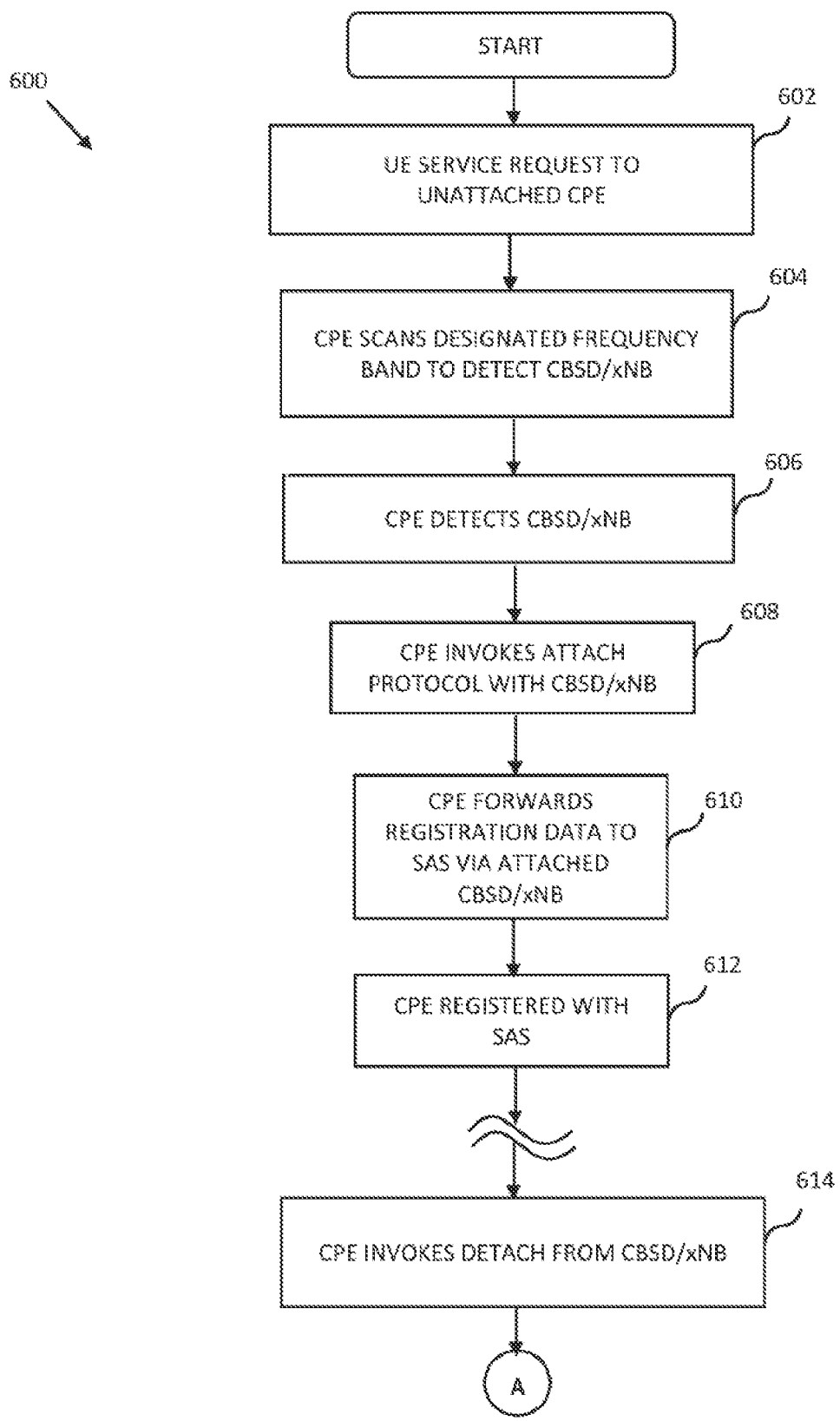
FIG. 6 is logical flow diagram of another exemplary method for providing quasi-licensed band spectrum (e.g., CBRS GAA) frequency reassignments according to the present disclosure, wherein the CPE detaches from the CBSD/xNB before the frequency transition occurs.
Figure 6:
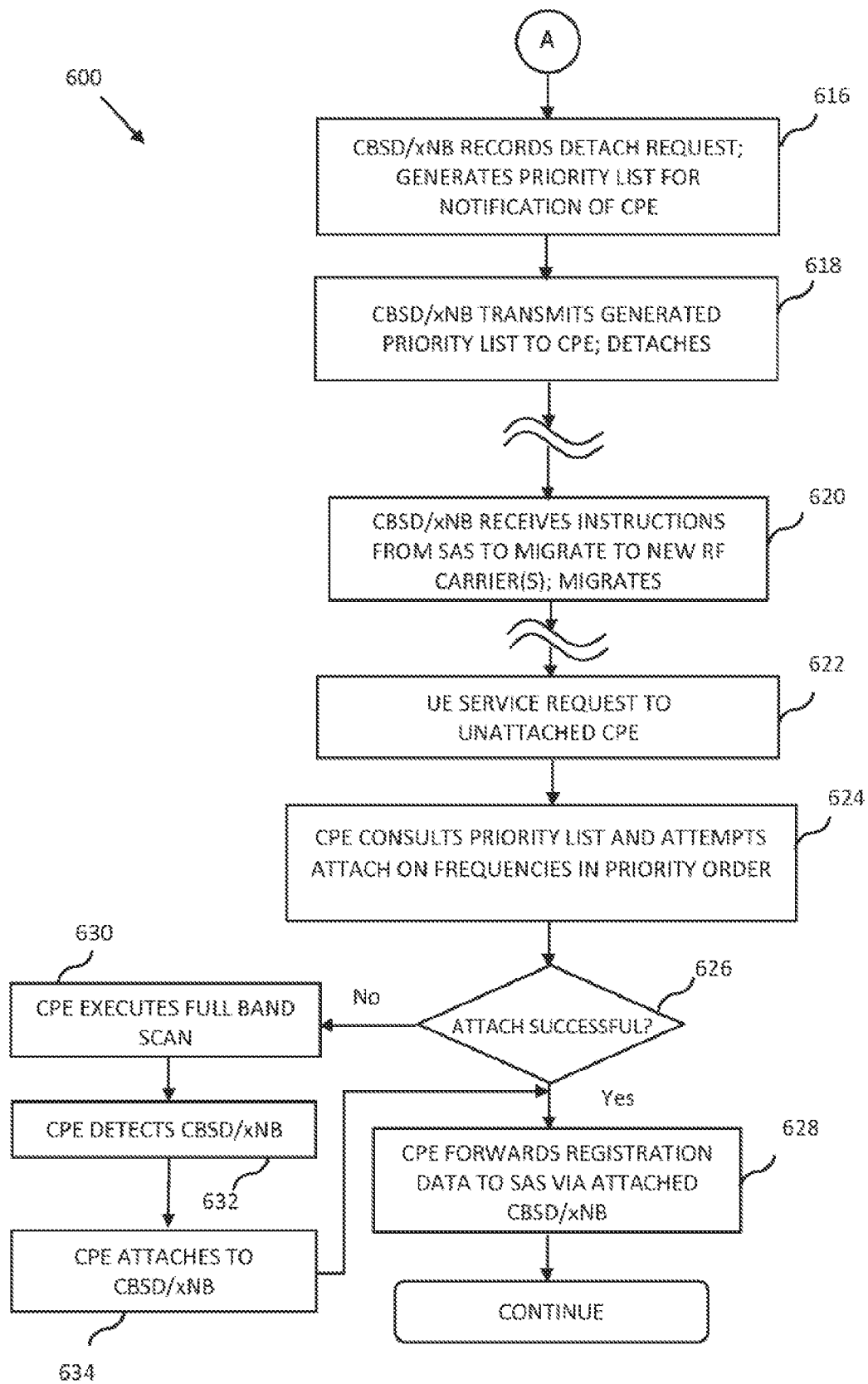

Various methods and embodiments thereof for providing quasi-licensed (e.g., CBRS GAA) spectrum reassignment according to the present disclosure are now described with respect to FIGS. 5-6.

Referring now to FIG. 5, one embodiment of the general methodology 500 of spectrum reassignment so as to mitigate user session disruption is shown and described, in the exemplary context of a CBRS-based system with SAS, CBSD/xNBs 314, and CPE 324 as previously described.

As discussed above, the CBSD/xNB(s) may interface with the host SAS directly, or via one or more interposed entities such as computerized domain proxy (DP) entities 408. For the purposes of illustration, it will be assumed that each of the registering CBSD/xNBs is/are associated with a common network operator (NO) domain, although this is not a requirement for practicing the method 500.

At step 502 of the method 500, the SAS assigns one or more RF carrier (s) to a given CBSD/xNB or group thereof, based on for instance lack of DoD usage of those carriers in the prescribed area(s). This assignment may occur for example via CBRS-compliant protocol messages transmitted from the SAS or DP to the target CBSD/xNBs indicating their frequency assignment(s) via wired or wireline communication (e.g., backhaul) between the target CBSD/xNBs and the SAS/DP.

Per step 504, the CBSD/xNB(s) establishes operation on the assigned carrier(s), including transmission or broadcast of signals detectable by CPE 324 operating in the area and within communication range.

Per step 506, the CPE 324 invokes its discovery procedures (such as upon UE service request, according to a prescribed schedule, after CPE device re-initialization, etc.) and begins its scan of one or more prescribed frequency bands to attempt to detect and identify a serving CBSD/xNB 314. As previously discussed, such scans can be comparatively time-consuming, and per step 508, the CPE eventually detects one or more of the CBSD/xNBs operating on the SAS-assigned carriers from steps 502-504.

Per step 510, the CPE 324 invokes an attach procedure toward a detected CBSD/xNB 314, and at completion of the procedure, is logically attached with (and in data communication with) the CBSD/xNB. At this point, the CPE forwards its registration data via the CBSD/xNB to the cognizant SAS/DP (step 512), and the CPE is subsequently registered with the SAS per step 514.

Per step 516, after a period of time, the cognizant SAS determines that one or more of the assigned RF carriers require reclamation or reassignment, such as based on incumbent detection or other conditions. The affected CBSD/xNBs accordingly receive instructions issued by the SAS to migrate to the new carrier(s).

Per step 518, the CBSD/xNBs receiving instructions from the SAS each notify their attached CPE 324 via, e.g., protocol messaging, of the impending migration of the carrier(s). As part of this notification (discussed below in greater detail with respect to FIG. 5a), an instructing CBSD/xNB includes data in the notification that instructs the CPE 324 as to the subsequent carrier(s) to be utilized for re-attachment after the migration, and temporal data regarding the migration.

Per step 520 of the method 500, the CBSD/xNB conducts the requisite migration to the new carrier(s) per the SAS allocation (including de-establishing operation on the carrier(s) being migrated away from), and the affected CPE 324 implement the instructions provided by the CBSD/xNB per step 518. In one variant (FIG. 5a), the CPE 324 suspends its operation for a prescribed period of time (T) contained in the instructions, and then upon expiration of T, attempts a re-attach procedure with the CBSD/xNB via one or more carriers designated within the instructions (step 522). This advantageously obviates a "full band/spectrum" search by the CPE 324, and greatly reduces the recovery/re-attach time (and hence greatly enhances user experience). It is noted that, depending on the magnitude of the time needed to perform such full band/spectrum search to discover the CBSD/xNB under the prior art, complete user session teardown may occur, effectively dropping connectivity of any higher-layer functions or applications being used by the user/US (such as e.g., Internet browsing, media streaming, etc.). As such, by significantly reducing the temporal delay of the re-attach procedure, the exemplary embodiments of the present disclosure advantageously may enhance not only user experience but also existing session continuity; i.e., by avoiding conditions (timeouts, failed heartbeats, etc.) which would otherwise trigger disestablishment of the existing session and require subsequent re-negotiation, which may include device/user authentication.

In other variants, the temporal value (T) described above is replaced with another metric for determining the duration of suspension, which is not a temporal value per se. For example, in one implementation, a metric such as a number of machine processing, clock, or communication cycles (which may or may not correspond to a prescribed time value) is used to specify the suspension behavior of the device (e.g., CPE 324). As referenced above, it may be that under the prescribed protocols in place, a communication session is determined to be "timed out" or will be terminated after the occurrence of one or more events, such as failure of a prescribed number of retries, failure to receive a prescribed number of ACKs for messages sent, failure to receive a predetermined number of heartbeats, failure to receive a sufficient number of packets within a given time (e.g., in support of a QoS or other requirement), failure of a cryptographic negotiation procedure (e.g., key generation/exchange procedure to authenticate the CPE to the wireless access point) to resolve or complete, or any number of other "preconditions" for determination that an extant session is in fact dead. As such, the various implementations of the present disclosure may use one or more of the foregoing, whether alone or in combination with T, to more finely assess when the CPE should attempt re-attach or conduct other related operations. It may be, for example, that certain sessions or types of sessions can persist longer than others (e.g., until one or more of the above events occurs), and hence the re-attach commencement can be set to anticipate such events sufficiently that the session is not torn down before reattachment on the new carrier occurs.

Lastly, per step 524, the CPE 324 forwards its registration data to the SAS via the now-attached CBSD/xNB 314. In one embodiment, the registration data includes data relating to the reassigned carrier (i.e., the same carrier that the SAS/DP previously instructed the CBSD/xNB to switch to), and hence the SAS accordingly has both the CBSD/xNB and CPE registered as operating on that same carrier within its database.

In the exemplary embodiment, the SAS has knowledge of the individual channels (both GAA and PAL) in a given region, and the identities of the CBSD/xNBs (and CPE 324) to which a given channel is assigned or being used. In situations where there is need for revocation of a given channel (e.g., due to incumbent needs), the SAS needs to identify the impacted CBSDs/CPE. Note that the revocation may be applicable only to a particular geographic region, and hence only a subset of CBSDs/CPE may need to relinquish the channel needed by some incumbent. The SAS having knowledge of both (i) the information regarding the channel needed by an incumbent, and (ii) the affected region, enables identification of CBSDs which are required to relinquish their assigned channel.

Referring now to FIG. 5a, an exemplary implementation of the generalized methodology 500 of FIG. 5 is shown and described.

Figure 2:
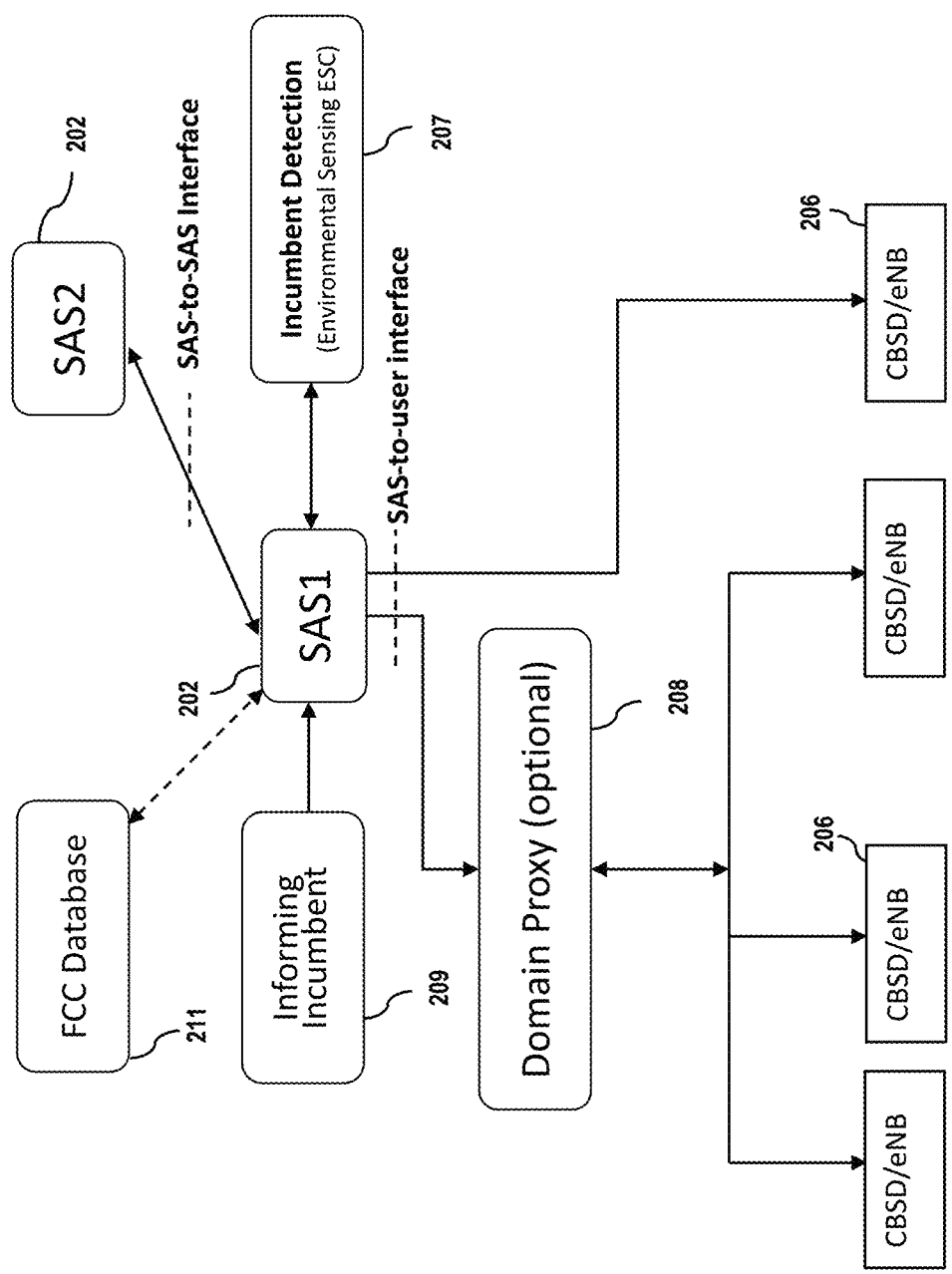
FIG. 2 is a block diagram illustrating a general architecture for the CBRS system of the prior art.
Figure 2B:
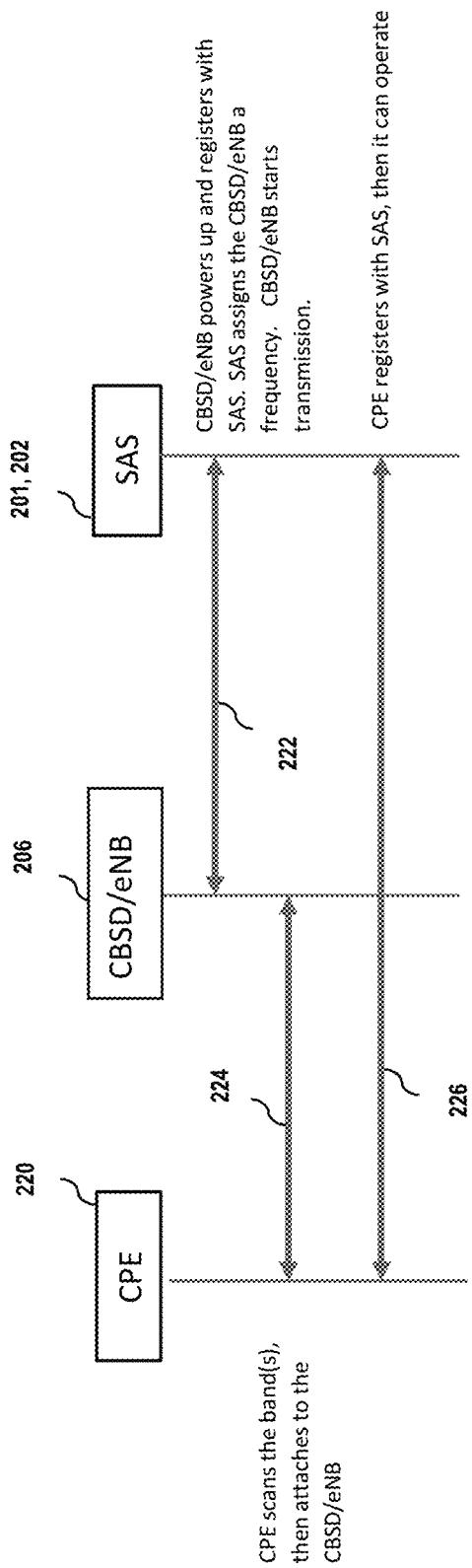
FIG. 2b is a ladder diagram illustrating a prior art CPE and CBSD/xNB registration procedure used with a SAS.
Figure 2C:
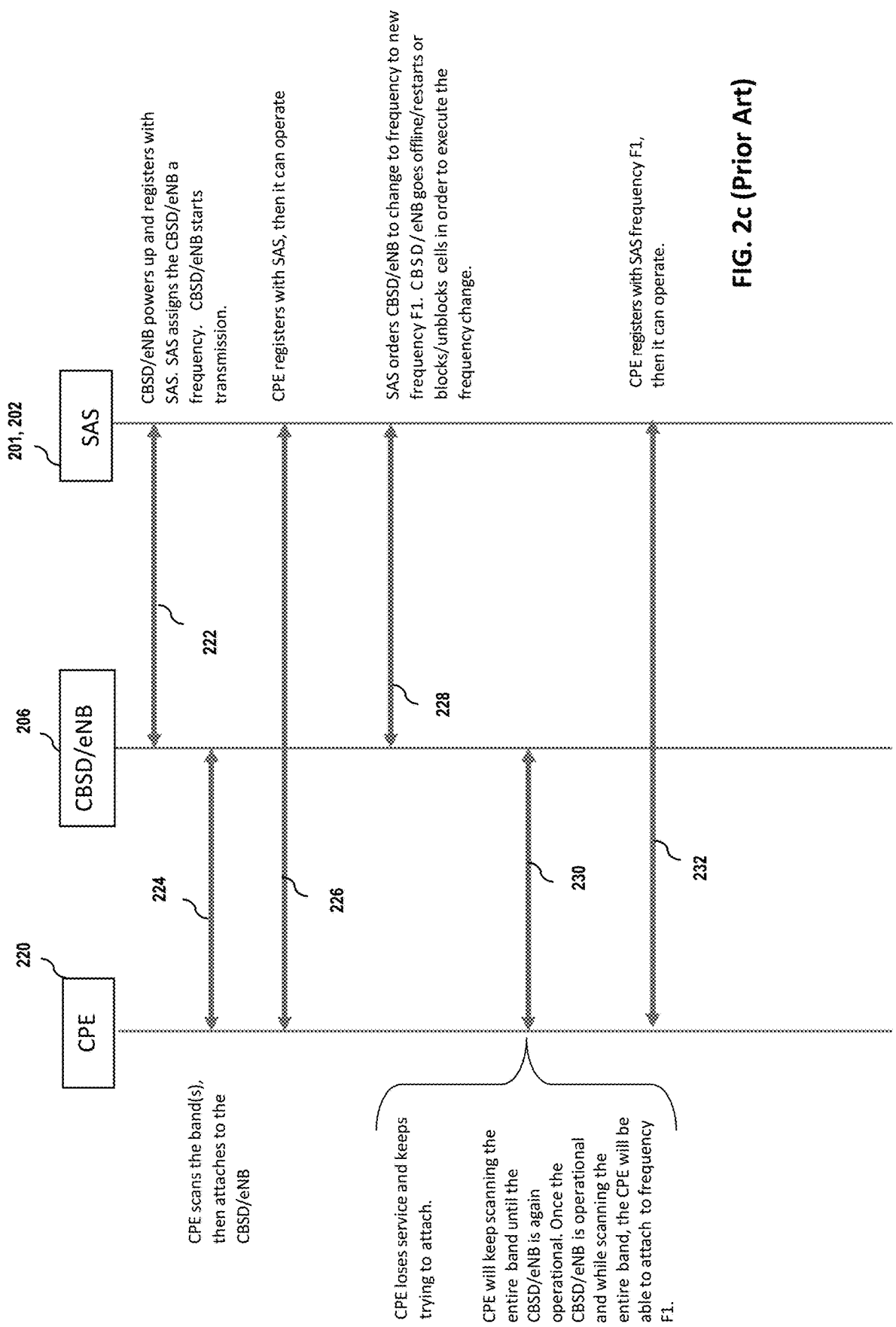
FIG. 2c is a ladder diagram illustrating a prior art frequency change/re-registration procedure.

Currently, as shown and discussed previously with respect to FIG. 2b, a prior art CBSD/xNB registers with SAS and obtains a frequency assignment. Then, the CPE "attaches" to the CBSD/xNB, such as via scan of one or more frequency bands to detect emissions from the CBSD/xNB. Once the attachment is complete, the CPE's first task is to register with a SAS. However, the SAS has no mechanism by which to associate a CPE with any given CBSD/xNB. Rather, the SAS sees both devices effectively as separate CBSDs registered to that SAS. If, for any reason, the SAS changes the CBSD/xNB's frequency (such as e.g., due to incumbent detection), the CBSD/xNB will have to restart or block its cells for a time period until the frequency change is effected. The CPE 220 will not receive the same frequency change command from the SAS. As a result of the CBSD/xNB frequency change ordered by the SAS, the CPE loses service until the CBSD/xNB completes the frequency change, and can be detected (again) (i.e., once the CBSD/xNB is up and starts transmitting, the CPE will scan the entire band again before it can attach and perform SAS registration. In contrast, the inventive approach of FIG. 5a overcomes the foregoing disabilities by, inter alia, enabling communication between the CBSD/xNB 314 and the affected CPE 324 via the improvements described herein. Specifically, as shown in the implementation of FIG. 5a, the CBSD/xNB powers up, registers with and obtains a frequency (carrier) allocation from, the cognizant SAS, and begins operation on the allocated carrier(s) per step 532. The attaching CPE 324 scans the appropriate bands using "normal" (unmodified) scan procedures, and attaches to the CBSD/xNB (step 534). The CPE then registers with the SAS per step 536. Subsequently, after notification of a frequency/carrier change by the SAS (step 538) to new frequency F1, the CBSD/xNB informs the CPE that the CBSD/xNB's services will be unavailable for a prescribed period of time (T) per step 540. This value of T is selected a priori in the exemplary implementation (based on for example a known or nominal time that the CBSD/xNB 314 takes to switch over to the new carrier(s)), although the present disclosure also contemplates instances where the value of T is determined dynamically (whether longer or shorter than nominal) based on other criteria, such as for example delays in utilization of the new carrier(s) by a releasing entity or device, the CBSD/xNB having already commenced the switch at time of generation of the notification message(s) to the affected CPE 324, etc.

Moreover, it will be recognized that different affected CPE 324 may be granted different values of T based on their configuration, status, current operations (e.g., support of more or less critical applications or processes for end users, whether bearing traffic requiring a prescribed QoS or temporal/latency requirements, etc.). As such, CPE 324 may also be "staggered" in time if desired, as to notification and/or as to the value of T.

Per step 542 of FIG. 5a, the CBSD/xNB goes offline and invokes its frequency reassignment routines (which may include a restart, blocking/unblocking cells, etc.) in order to effect the frequency change dictated by the SAS.

During the period T, the CPE 324 may signal its connected UE or other devices with a "suspend" command or data, which causes applications or other processes on the UE to also wait a prescribed period, ostensibly so as to avoid the application/process from inadvertently "timing out" while waiting for T to expire. This may be an active process (e.g., a particular command from CPE to UE process configured to cause suspension), or a passive one (e.g., the CPE may simply send the application/process some extant protocol message or communication to avoid any potential timeout.

At step 544, after T expires, the CPE 324 invokes its particular frequency re-acquisition instructions, which obviates a more comprehensive scan or other normal acquisition operations and hence greatly reduces the time for the CPE to acquire the CBSD/xNB on the new carrier(s) and re-attach. In one variant, the CPE 324 is provided a single carrier on which to acquire the CBSD/xNB 314 (F1 in the example of FIG. 5a), and the CPE detects energy within that carrier and invokes its attachment protocol accordingly. In another variant, the CPE 324 is given a prioritized list of carriers to try (in order of priority), so as to provide a fallback in the event that it cannot detect the CBSD/xNB on the first carrier.

Once the CPE detects and attaches to the CBSD/xNB on the new carrier(s), the CPE registers with the SAS as operating on the assigned frequency (F1 in the example of FIG. 5a) per step 546.

It is noted that as part of the communication of step 538, the SAS may also indicate to the target CBSD/xNB whether the provided RF carrier is the "final" RF carrier as well, or merely a temporary or ephemeral carrier to be used for a transition only. This may be accomplished either by inclusion of information in the protocol message (e.g., an IE specifying the RF carrier status or condition), or the absence of data (e.g., where no IE is provided or the IE is empty, the CBSD/xNB can infer that the RF carrier is of one type or the other). See co-owned and co-pending U.S. patent application Ser. No. 15/986,614 entitled "METHODS AND APPARATUS FOR INTRA-CELL AND INTER-FREQUENCY MOBILITY OPTIMIZATION AND MITIGATION OF SESSION DISRUPTION IN A QUASI-LICENSED WIRELESS SYSTEM" filed May 22, 2018 previously incorporated herein for exemplary frequency migration schemes involving temporary or "bridge" carriers, which may be utilized consistent with the present disclosure. For instance, in one such variant, the SAS signals the bridge or temporary carrier (F1) and the final carrier (F2) to the CBSD/xNB 314 per step 508, and the value of T is determined to accommodate both migrations (from F0 to F1, and F1 to F2). In another variant, individual operations such as that shown in FIG. 5a are performed for each frequency/carrier separately.

As referenced above, the CBSD/xNB defines a timer parameter that is given to affected CPE to be used to allow completion of the inter-frequency transition within the time defined by the timer parameter (T). It will be recognized, however, that the SAS or DP may provide and forward this parameter to the CBSD/xNB. For instance, as part of the protocol communication of step 538, the SAS may utilize a defined IE (information element) present in a configuration or status message, with the value of the timer specified. For example, in one variant, the SAS and CBSDs continuously exchange Heartbeat (HB) messages to maintain the status of the allocated channels, perform "health" checks, etc. These messages may also be used by a SAS to terminate a grant/revoke previously granted channel. In one implementation, an IE is added to the HB message to enable the SAS to provide data including: (i) data indicating one or more alternate channels to be utilized; (ii) data indicative of whether the channel is temporary or permanent; and (iii) data indicating duration of the CPE "wait" period T corresponding to the CBSD/xNB to change to alternate channel(s) provided (which the CBSD/xNB then forwards to the CPE per step 540).

Likewise, the CPE 324 itself may maintain data on various specific CBSD/xNB devices (or classes of devices) and apply its own indigenously selected value of T when it receives notification of the impending CBSD/xNB non-availability per step 540. For example, the CBSD/xNB may include a device identifier for itself which enables the CPE 324 to select an appropriate value of T. As noted above, these values may also be dynamically selected or situationally dependent; e.g., the CPE may maintain different values of T for a given CBSD/xNB 314 or class of devices based on data forwarded to the CPE relating to the CBSD/xNB current configuration or operational condition. Longer or shorter values of T may be appropriate based on the condition/ operations of the CBSD/xNB at the time the SAS dictates a frequency change.

It is also noted that the CPE's use of a specific frequency when performing registration with the SAS (i.e., after re-attachment) also may decrease the SAS grant time response. For instance, in one configuration, the SAS may be required to conduct less processing to register the CPE within its database in association with a prescribed frequency, since that frequency has already been assigned to the parent CBSD/xNB that the CPE is re-attaching to. In one variant, the SAS does not have to research/identify a "new" frequency for the CPE (which it sees in some aspects as merely another CBSD), but rather is presented with, in a sense, a "pre-approved" frequency (i.e., that very recently allocated to the CBSD/xNB) and hence can directly register the CPE with that same frequency with which the CPE is necessarily already operating.

Referring now to FIG. 6, another embodiment of a method for providing quasi-licensed band spectrum (e.g., CBRS GAA) frequency reassignments according to the present disclosure, wherein the CPE detaches from the CBSD/xNB before the frequency transition occurs.

As shown in FIG. 6, the first step 602 of the method 600 includes the UE or other device requesting network service from the CPE 324. This may occur via any number of mechanisms, including for example an application running on the UE/device requesting data, attempting to open a session with a remote server, or at lower levels such as where the UE detects the presence of the CPE 324 via a broadcast channel and attempts to establish a connection. In this example, the CPE 324 is not at this point attached to any CBSD/xNB 314.

Next, per step 604, the CPE 324 scans one or more designated frequency bands to detect the presence of the CBSD/xNB (in response to the UE/device service request). Per step 606, the CPE detects the CBSD/xNB on one or more carriers within the band, and invokes its attach protocol with the CBSD/xNB per step 608.

Per step 610, the CPE forwards its registration data to the cognizant SAS via the (now attached) CBSD/xNB 314, and the CPE is registered with the SAS per step 612.

After a period of time, the CPE invokes a detach operation directed toward the CBSD/xNB per step 614. This may be the result of any number of circumstances, such as lack of UE/device traffic or service for a period of time, reboot of the CPE, testing/maintenance, etc. Per step 616, the CBSD/xNB receives and records the detach request (such as within a mass storage device of the CBSD/xNB or a proxy storage device), and generates a priority list for transmission (notification) of the detaching CPE 324. As discussed above, this priority list is in one implementation a "cheat sheet" for the CPE 324 to use on subsequent attachment so that it can ideally obviate a full scan of the relevant band(s) to detect the CBSD/xNB; rather, the listed carriers in the priority list are used in order to attempt to detect the CBSD/xNB during such subsequent re-attachment. The generation of the priority list may be based on for example historical or recent data relating to SAS RF carrier assignments for that CBSD/xNB, such as where the SAS tends to routinely allocate carriers to that particular CBSD/xNB from within a small/repetitive group of carriers within the 3.55 to 3.7 GHz band. As can be appreciated, this technique will have more benefit when such limited or repeating allocations are made, as opposed to for instance a wholly random process used by the SAS for carrier allocations (the latter having no predictability from the CPE's perspective).

Per step 618, the CBSD/xNB transmits the priority list to the CPE 324, and upon receipt, the CPE invokes its detach procedure to detach from the CBSD/xNB.

After a period of time, the CBSD/xNB receives instructions from the SAS or DP to migrate to a new RF carrier or carriers (step 620); upon receipt of the instructions, the CBSD/xNB conducts the migration. Since the CPE is not attached at this point, the CBSD/xNB does not need to notify it (as in the method 500 of FIG. 5).

After a period of time, the UE (or other device) again invokes a service request to its CPE 324 per step 622. In response, the (unattached) CPE accesses its priority list previously received from the CBSD/xNB, and begins attempting detection on discrete ones of the listed RF carriers in order of priority (step 624). Ideally, as noted above, the SAS is somewhat predictable, and hence the CPE can save appreciable time by avoiding a full-scan of the entire band as would be otherwise used in such cases.

Note also that the priority list may include "band" values (e.g., center frequency plus/minus a prescribed band) to search such that the SAS is predictable as to certain bands (versus discrete frequencies). For instance, the SAS may, for a given CBSD/xNB, almost always pick frequencies between 3.660 and 3.665 GHz for allocation; as such, the CPE can scan that band alone, and avoid having to scan say the entire 3.55 to 3.70 GHz band (which is 30 times larger in frequency bandwidth, and hence presumably take proportionately longer to scan).

Returning again to FIG. 6, per step 626, the CPE will attempt to attach itself to the CBSD/xNB via the listed carriers until either (i) attach is successful, in which case the CPE registers with the SAS (via the CBSD/xNB) at the new carrier frequency (step 628), or (ii) the CPE runs out of priority list entries, in which case it executes a full-band scan (step 630) to ultimately detect and attach to the CBSD/eNB (steps 632-634).

CBSD/xNB Apparatus—

Figure 7:
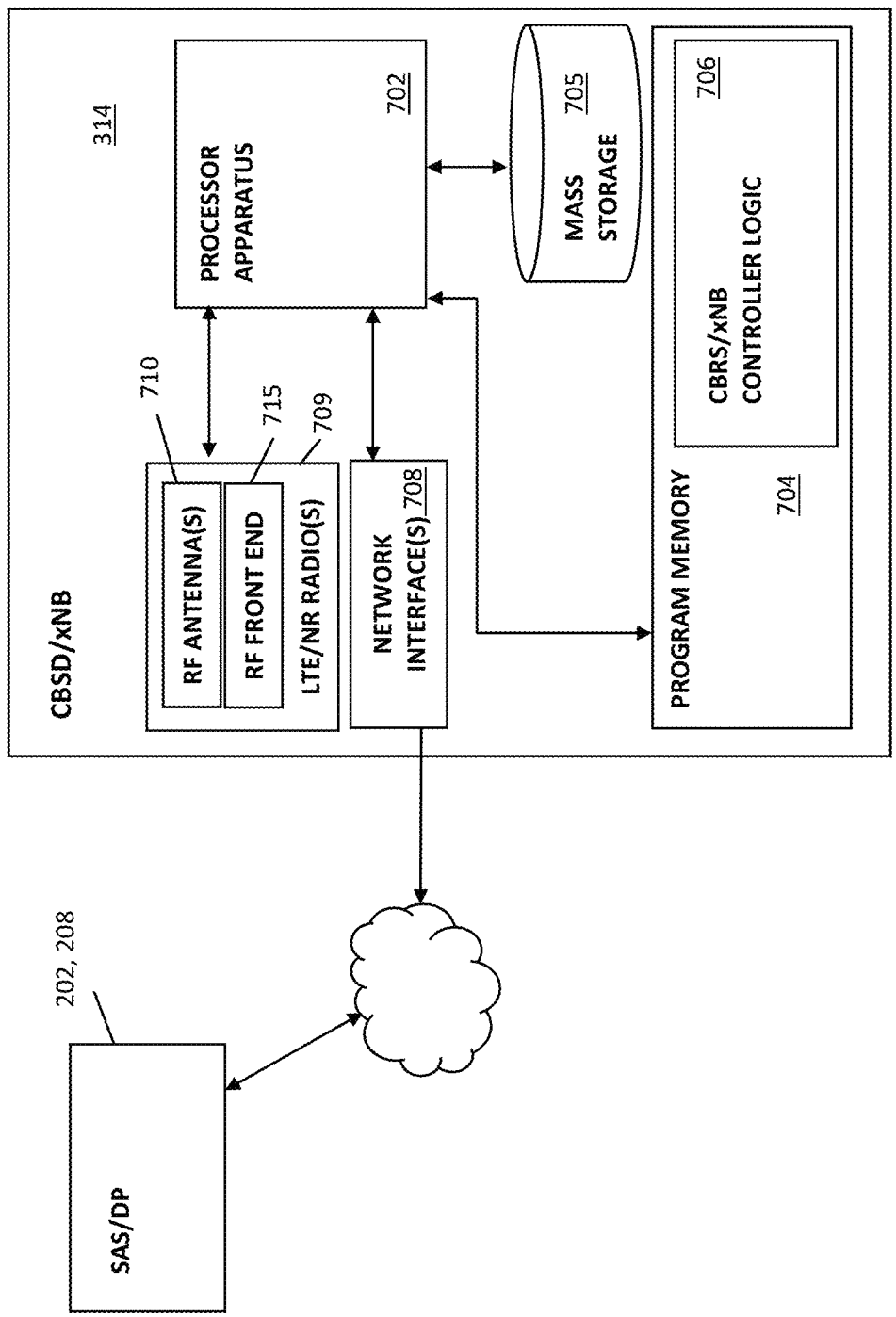
FIG. 7 is a functional block diagram illustrating an exemplary embodiment of a Citizens Broadband radio Service Device (CBSD) and eNodeB (eNB) or CBSD/xNB apparatus according to the present disclosure.

FIG. 7 illustrates an exemplary CBSD/xNB access node 314 according to the present disclosure. As shown, the CBSD/xNB 314 includes, inter alia, a processor apparatus or subsystem 702, a program memory module 704, mass storage 705, a CBRS/xNB controller logic module 706, one or more network (e.g., SAS/DP, controller 310a and LAN) interfaces 708, as well as one or more radio frequency (RF) devices 809 having, inter alia, antenna(e) 710 and one or more RF tuners 715.

At a high level, the exemplary CBSD/xNB 314 of FIG. 7 maintains in effect two "stacks"; (i) a CBRS-compliant stack for communication of the CBSD/xNB (acting as a CBRS-compliant entity) with other CBRS entities such as SAS/DP, according to e.g., the Signaling Protocols and Procedures for Citizens Broadband Radio Service (CBRS): Spectrum Access System (SAS)—Citizens Broadband Radio Service Device (CBSD) Interface Technical Specification—Document WINNF-TS-0016, Version V1.2.1. 3, January 2018, incorporated herein by reference in its entirety; and (ii) a 3GPP-compliant LTE/LTE-A/5G NR "stack" for CBSD/xNB (acting as a EUTRAN eNB) communications with 3GPP-compliant UEs (mobile devices 306), and/or with one or more CPE 324 such as described above with respect to FIGS. 5 and 6. These two stacks are implemented and controlled via the controller process (logic) 706 of the CBSD/xNB 314 such that CBSD/xNB-to-SAS communication protocols and CBSD/xNB-to-CPE protocols are used in a coordinated fashion to enhance session continuity and perform the enhanced frequency reassignment functionality previously described.

In the exemplary embodiment, the processor 702 may include one or more of a digital signal processor, microprocessor, field-programmable gate array, or plurality of processing components mounted on one or more substrates. The processor 702 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 702.

The RF antenna(s) 710 are configured to detect and transceive signals from radio access technologies (RATs) in the service area or venue with which the CBSD/xNB is associated. For example, LTE (including, e.g., LTE, LTE-A, LTE-U, LTE-LAA) signals may be used as the basis of communication between the CBSD/xNB 314 and the various mobile devices (e.g., UEs) and/or CPE 324 being served. The antenna(s) 710 may include multiple spatially diverse individual elements in e.g., a MIMO- or MISO-type configuration, such that spatial diversity of the transceived signals can be utilized.

In the exemplary embodiment, the radio interface(s) comprise one or more LTE-based radios compliant with 3GPP. Additional unlicensed, licensed, or quasi-licensed air interfaces may also be used within the CBSD/xNB, including e.g., Wi-Fi, non-CBRS band LTE, 5G NR, or others. Moreover, the LTE radio functionality may be extended to incipient 3GPP-based 5G NR protocols; e.g., at maturation of LTE deployment and when 5G NR-enabled handsets are fielded, such adaptation being accomplished by those of ordinary skill given the contents of the present disclosure. As a brief aside, NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core).

In some aspects, exemplary Release 15 NG-RAN leverages technology and functions of extant LTE/LTE-A technologies (colloquially referred to as 4G or 4.5G), as bases for further functional development and capabilities. For instance, in an LTE-based network, upon startup, an eNB (base station) establishes S1-AP connections towards the MME (mobility management entity) whose commands the eNB is expected to execute. An eNB can be responsible for multiple cells (in other words, multiple Tracking Area Codes corresponding to E-UTRAN Cell Global Identifiers). The procedure used by the eNB to establish the aforementioned S1-AP connection, together with the activation of cells that the eNB supports, is referred to as the S1 SETUP procedure; see inter alia, 3GPP TS 36.413 V14.4. entitled "3rd Generation Partnership Project; Technical Specification Group Radio Access Network; Evolved Universal Terrestrial Radio Access Network (E-UTRAN); S1 Application Protocol (S1AP) (Release 14)" dated September 2017, which is incorporated herein by reference in its entirety.

As such, the various aspects of the present disclosure can be readily adapted for use within the 5G NR context, including use of a CBSD/gNB, and associated CU/DU functionality and "splits" to implement the seamless handover functions described herein. The tuner 715 in one embodiment comprises a digitally controlled RF tuner capable of reception of signals via the RF front end (receive chain) of the LTE radio 709 in the aforementioned bands, including in one variant simultaneous reception (e.g., both 2.300 to 2.500 and 3.550 to 3.700 GHz bands at the same time).

The processing apparatus 702 is configured to execute at least one computer program stored in memory 804 (e.g., a non-transitory computer readable storage medium); in the illustrated embodiment, such programs include logic to implement the frequency reassignment logic described previously herein (see e.g., FIGS. 5 and 6 herein). Other embodiments may implement such functionality within dedicated hardware, logic, and/or specialized co-processors (not shown).

In some embodiments, the controller logic program 706 utilizes memory 704 or other storage 705 configured to temporarily hold a number of data reports or files before transmission via the backend interface(s) 710 to the SAS 202, 203, DP 208, and/or CC 310 (if present). In other embodiments, application program interfaces (APIs) such as those included in an MSO-provided application or those natively available on the CBSD/xNB (e.g., as part of the computer program noted supra or associated with the controller logic 706) may also reside in the internal cache or other memory 704. Such APIs may include common network protocols or programming languages configured to enable communication between the CBSD/xNB 314 and SAS/DP, and/or CC 310 and other network entities as well as use procedures for collecting, compressing and/or parsing information obtained via the antenna(s) 708 and radio 709. Data stored may relate for example to prescribed 3GPP or CBRS reporting from the UEs (e.g., measurement report data, RSSI, active applications operative on a given UE for purposes of evaluating session activity/currency, etc.) such that a receiving device (e.g., SAS/DP, controller 310, or other EUTRAN or 5GC entity) may interpret the reports in order to extract and analyze the relevant information.

CPE Apparatus—

Figure 8:
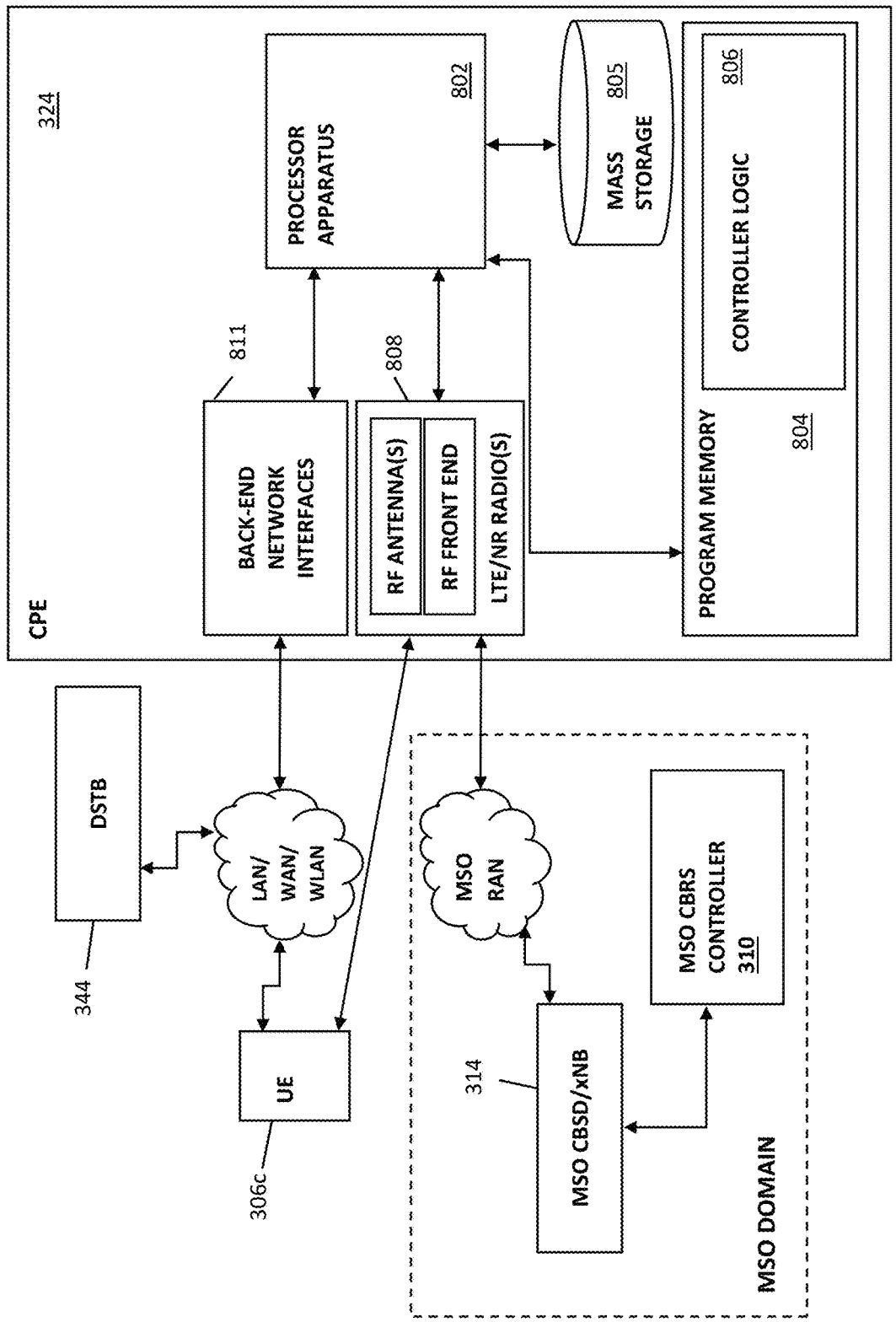
FIG. 8 is a functional block diagram illustrating one embodiment of an exemplary Consumer Premises Equipment (CPE) apparatus according to the present disclosure.

FIG. 8 illustrates an exemplary CPE 324 (e.g., FWA or other device) configured according to the present disclosure. As shown, the CPE 324 includes, inter alia, a processor apparatus or subsystem 802, a program memory module 804, mass storage 805, CPE controller logic module 806, one or more front end wireless network interfaces 808 for communication with e.g., CBSD/xNB, DP (if any), the MSO controller 310 and LAN, as well as one or more back end interfaces 811 such as for establishment of a WLAN AP within the served premises, Gigabit Ethernet or other LAN connectivity, support of gateways, DSTBs 344, etc. within the premises, etc., and for communicating with e.g., local equipment such as test/configuration devices or terminals.

In the exemplary embodiment, the processor 802 may include one or more of a digital signal processor, microprocessor, field-programmable gate array, or plurality of processing components mounted on one or more substrates. The processor 802 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 802.

The processor 802 is configured to execute at least one computer program stored in memory 904 (e.g., a non-transitory computer readable storage medium); in the illustrated embodiment, such programs include logic to implement the RF carrier pool maintenance and migration logic described previously herein. Other embodiments may implement such functionality within dedicated hardware, logic, and/or specialized co-processors (not shown).

The CBRS stack of the CPE is implemented and controlled via the controller process (logic) 806 of the CPE 324 such that CBSD/xNB-to-CPE communication protocols are used to enhance session continuity and perform the frequency reassignment functionality previously described, including CPE functions such as (i) receipt of the instructions and/or priority list data from the CBSD/xNB, implementing the wait timer (T), frequency band scanning or reduced scans (e.g., direct attach attempts at one or more prescribed frequencies, such as those designated in the instructions or the priority list). The logic 806 may also manage other aspects of CPE operation, including "intelligent" detach procedures such as when no UE or other user traffic exists.

In the illustrated embodiment, the CPE 324 may communicate directly with the UE 306c as shown, such as via WLAN or 3GPP LTE/LTE-A/NR protocols, in effect acting as a base station thereto. For use of the 3GPP protocols, this may be the case where the CBSD/xNB is out of wireless range of the UE.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

APPENDIX I

LTE frequency bands - TS 36.101 (Rel. 14 June 2017)

| Band | Name | Downlink (MHz) Low | Downlink (MHz) Middle EARFCN[1] | Downlink (MHz) High | Bandwidth DL/UL (MHz) | Uplink (MHz) Low | Uplink (MHz) Middle EARFCN | Uplink (MHz) High | Duplex spacing (MHz) | Equivalent UMTS band |
|---|---|---|---|---|---|---|---|---|---|---|
| 1 | 2100 | 2110 / 0 | 2140 / 300 | 2170 / 599 | 60 | 1920 / 18000 | 1950 / 18300 | 1980 / 18599 | 190 | 1 |
| 2 | 1900 PCS | 1930 / 600 | 1960 / 900 | 1990 / 1199 | 60 | 1850 / 18600 | 1880 / 18900 | 1910 / 19199 | 80 | 2 |
| 3 | 1800+ | 1805 / 1200 | 1842.5 / 1575 | 1880 / 1949 | 75 | 1710 / 19200 | 1747.5 / 19575 | 1785 / 19949 | 95 | 3 |
| 4 | AWS-1 | 2110 / 1950 | 2132.5 / 2175 | 2155 / 2399 | 45 | 1710 / 19950 | 1732.5 / 20175 | 1755 / 20399 | 400 | 4 |
| 5 | 850 | 869 / 2400 | 881.5 / 2525 | 894 / 2649 | 25 | 824 / 20400 | 836.5 / 20525 | 849 / 20649 | 45 | 5 |
| 6 | UMTS only | 875 / 2650 | 880 / 2700 | 885 / 2749 | 10 | 830 / 20650 | 835 / 20700 | 840 / 20749 | 45 | 6 |
| 7 | 2600 | 2620 / 2750 | 2655 / 3100 | 2690 / 3449 | 70 | 2500 / 20750 | 2535 / 21100 | 2570 / 21449 | 120 | 7 |
| 8 | 900 GSM | 925 / 3450 | 942.5 / 3625 | 960 / 3799 | 35 | 880 / 21450 | 897.5 / 21625 | 915 / 21799 | 45 | 8 |
| 9 | 1800 | 1844.9 / 3800 | 1862.4 / 3975 | 1879.9 / 4149 | 35 | 1749.9 / 21800 | 1767.4 / 21975 | 1784.9 / 22149 | 95 | 9 |
| 10 | AWS-1+ | 2110 / 4150 | 2140 / 4450 | 2170 / 4749 | 60 | 1710 / 22150 | 1740 / 22450 | 1770 / 22749 | 400 | 10 |
| 11 | 1500 Lower | 1475.9 / 4750 | 1485.9 / 4850 | 1495.9 / 4949 | 20 | 1427.9 / 22750 | 1437.9 / 22850 | 1447.9 / 22949 | 48 | 11 |
| 12 | 700 a | 729 / 5010 | 737.5 / 5095 | 746 / 5179 | 17 | 699 / 23010 | 707.5 / 23095 | 716 / 23179 | 30 | 12 |
| 13 | 700 c | 746 / 5180 | 751 / 5230 | 756 / 5279 | 10 | 777 / 23180 | 782 / 23230 | 787 / 23279 | −31 | 13 |
| 14 | 700 PS | 758 / 5280 | 763 / 5330 | 768 / 5379 | 10 | 788 / 23280 | 793 / 23330 | 798 / 23379 | −30 | 14 |
| 17 | 700 b | 734 / 5730 | 740 / 5790 | 746 / 5849 | 12 | 704 / 23730 | 710 / 23790 | 716 / 23849 | 30 | |
| 18 | 800 Lower | 860 / 5850 | 867.5 / 5925 | 875 / 5999 | 15 | 815 / 23850 | 822.5 / 23925 | 830 / 23999 | 45 | |
| 19 | 800 Upper | 875 / 6000 | 882.5 / 6075 | 890 / 6149 | 15 | 830 / 24000 | 837.5 / 24075 | 845 / 24149 | 45 | 19 |
| 20 | 800 DD | 791 / 6150 | 806 / 6300 | 821 / 6449 | 30 | 832 / 24150 | 847 / 24300 | 862 / 24449 | −41 | 20 |
| 21 | 1500 Upper | 1495.9 / 6450 | 1503.4 / 6525 | 1510.9 / 6599 | 15 | 1447.9 / 24450 | 1455.4 / 24525 | 1462.9 / 24599 | 48 | 21 |
| 22 | 3500 | 3510 / 6600 | 3550 / 7000 | 3590 / 7399 | 80 | 3410 / 24600 | 3450 / 25000 | 3490 / 25399 | 100 | 22 |
| 23 | 2000 S-band | 2180 / 7500 | 2190 / 7600 | 2200 / 7699 | 20 | 2000 / 25500 | 2010 / 25600 | 2020 / 25699 | 180 | |
| 24 | 1600 L-band | 1525 / 7700 | 1542 / 7870 | 1559 / 8039 | 34 | 1626.5 / 25700 | 1643.5 / 25870 | 1660.5 / 26039 | −101.5 | |
| 25 | 1900+ | 1930 / 8040 | 1962.5 / 8365 | 1995 / 8689 | 65 | 1850 / 26040 | 1882.5 / 26365 | 1915 / 26689 | 80 | 25 |
| 26 | 850+ | 859 / 8690 | 876.5 / 8865 | 894 / 9039 | 35 | 814 / 26690 | 831.5 / 26865 | 849 / 27039 | 45 | 26 |
| 27 | 800 SMR | 852 / 9040 | 860.5 / 9125 | 869 / 9209 | 17 | 807 / 27040 | 815.5 / 27125 | 824 / 27209 | 45 | |
| 28 | 700 APT | 758 / 9210 | 780.5 / 9435 | 803 / 9659 | 45 | 703 / 27210 | 725.5 / 27435 | 748 / 27659 | 55 | |
| 29 | 700 d | 717 / 9660 | 722.5 / 9715 | 728 / 9769 | 11 | Downlink only | | | | |
| 30 | 2300 WCS | 2350 / 9770 | 2355 / 9820 | 2360 / 9869 | 10 | 2305 / 27660 | 2310 / 27710 | 2315 / 27759 | 45 | |
| 31 | 450 | 462.5 / 9870 | 465 / 9895 | 467.5 / 9919 | 5 | 452.5 / 27760 | 455 / 27785 | 457.5 / 27809 | 10 | |
| 32 | 1500 L-band | 1452 / 9920 | 1474 / 10140 | 1496 / 10359 | 44 | Downlink only | | | | 32 |
| 65 | 2100+ | 2110 / 65536 | 2155 / 65986 | 2200 / 66435 | 90 | 1920 / 131072 | 1965 / 131522 | 2010 / 131971 | 190 | |
| 66 | AWS-3 | 2110 / 66436 | 2155 / 66886 | 2200 / 67335 | 90/70 | 1710 / 131972 | 1745 / 132322 | 1780 / 132671 | 400 | |
| 67 | 700 EU | 738 / 67336 | 748 / 67436 | 758 / 67535 | 20 | Downlink only | | | | |
| 68 | 700 ME | 753 / 67536 | 768 / 67686 | 783 / 67835 | 30 | 698 / 132672 | 713 / 132822 | 728 / 132971 | 55 | |

APPENDIX I-continued

LTE frequency bands - TS 36.101 (Rel. 14 June 2017)

| Band | Name | Downlink (MHz) Low | Downlink (MHz) Middle EARFCN[1] | Downlink (MHz) High | Bandwidth DL/UL (MHz) | Uplink (MHz) Low | Uplink (MHz) Middle EARFCN | Uplink (MHz) High | Duplex spacing (MHz) | Equivalent UMTS band |
|---|---|---|---|---|---|---|---|---|---|---|
| 69 | 2500 | 2570 67836 | 2595 68086 | 2620 68335 | 50 | | Downlink only | | | |
| 70 | AWS-4 | 1995 68336 | 2007.5 68461 | 2020 68585 | 25/15 | 1695 132972 | 1702.5 133047 | 1710 133121 | 300 | |
| 252 | Unlicensed NII-1 | 5150 255144 | 5200 255644 | 5250 256143 | 100 | | Downlink only | | | |
| 255 | Unlicensed NII-3 | 5725 260894 | 5787.5 261519 | 5850 262143 | 125 | | Downlink only | | | |
| | | | | | TDD | | | | | |
| 33 | TD 1900 | 1900 36000 | 1910 36100 | 1920 36199 | 20 | | | | | A(lo) |
| 34 | TD 2000 | 2010 36200 | 2017.5 36275 | 2025 36349 | 15 | | | | | A(hi) |
| 35 | TDPCS Lower | 1850 36350 | 1880 36650 | 1910 36949 | 60 | | | | | B(lo) |
| 36 | TDPCS Upper | 1930 36950 | 1960 37250 | 1990 37549 | 60 | | | | | B(hi) |
| 37 | TDPCS Center gap | 1910 37550 | 1920 37650 | 1930 37749 | 20 | | | | | C |
| 38 | TD 2600 | 2570 37750 | 2595 38000 | 2620 38249 | 50 | | | | | D |
| 39 | TD 1900+ | 1880 38250 | 1900 38450 | 1920 38649 | 40 | | | | | F |
| 40 | TD 2300 | 2300 38650 | 2350 39150 | 2400 39649 | 100 | | | | | E |
| 41 | TD 2500 | 2496 39650 | 2593 40620 | 2690 41589 | 194 | | | | | |
| 42 | TD 3500 | 3400 41590 | 3500 42590 | 3600 43589 | 200 | | | | | |
| 43 | TD 3700 | 3600 43590 | 3700 44590 | 3800 45589 | 200 | | | | | |
| 44 | TD700 | 703 45590 | 753 46090 | 803 46589 | 100 | | | | | |
| 45 | TD 1500 | 1447 46590 | 1457 46690 | 1467 46789 | 20 | | | | | |
| 46 | TD Unlicensed | 5150 46790 | 5537.5 50665 | 5925 54539 | 775 | | | | | |
| 47 | TD V2X | 5855 54540 | 5890 54890 | 5925 55239 | 70 | | | | | |
| 48 | TD 3600 | 3550 55240 | 3625 55990 | 3700 56739 | 150 | | | | | |

[1]EUTRA Absolute RF Channel Number

What is claimed is:

1. Computer readable apparatus comprising non-transitory storage medium, the non-transitory storage medium comprising at least one computer program having a plurality of instructions which are configured to, when executed on a computerized wireless access device with digital processor apparatus, cause the computerized wireless access device to:
generate, based at least on a determination that at least one RF (radio frequency) carrier in use by the computerized wireless access device as part of a communication session with a computerized wireless user device requires reassignment, a first information element (IE), the first IE comprising: (i) data relating to a selected new RF carrier, and (ii) reattachment criterion data, the reattachment criterion data specifying at least a suspension of one or more higher-layer functions or applications used by one or more computerized mobile devices that are in data communication with the computerized wireless user device;
transmit the first IE to the computerized wireless user device using the at least one RF carrier, the transmitted first IE configured to cause transition of operation of the computerized wireless user device to the selected new RF carrier; and
receive a reattachment request from the computerized wireless user device via at least the selected new carrier, the reattachment request having been transmitted from the computerized wireless user device after the at least one criterion specified by the reattachment criterion data has been met; and
based at least on the received reattachment request, establish wireless data communication between the computerized wireless user device and the computerized wireless access device using the selected new RF carrier.

2. The computer readable apparatus of claim 1, wherein the plurality of instructions are further configured to, when executed on the computerized wireless access device, cause the computerized wireless access device to:
receive at least one message generated by the computerized wireless user device, the at least one message comprising data to be reported to a network communication process in data communication with the computerized wireless access device; and transmit at least a portion of the data to be reported to the network communication process.

3. The computer readable apparatus of claim 2, wherein the transmission of the at least the portion of the data to be reported to the network communication process comprises forwarding of the received at least one message.

4. The computer readable apparatus of claim 2, wherein the transmission of the at least the portion of the data to be reported to the network communication process comprises generation of a second message addressed to the network communication process, the second message comprising second data to be reported to the network communication process relating to operation of the computerized wireless access device.

5. The computer readable apparatus of claim 1, wherein the at least one criterion specified by the reattachment criterion data comprises a criterion which will maintain continuity of the communication session.

6. The computer readable apparatus of claim 1, wherein the plurality of instructions are further configured to, when executed on the computerized wireless access device, cause the computerized wireless access device to further transmit first data configured to cause the computerized wireless user device to not perform a radio frequency scan which it would otherwise perform but for receipt of the first data.

7. The computer readable apparatus of claim 1, wherein:
the determination that the at least one RF (radio frequency) carrier in use by the computerized wireless access device as part of the communication session with the computerized wireless user device requires reassignment comprises receipt of data from one of a SAS (Spectrum Access System) or a Domain Proxy (DP) the received data indicative of the reassignment from the at least one RF carrier to the selected new RF carrier; and
the establishment of the wireless data communication between the computerized wireless user device and the computerized wireless access device using the selected new RF carrier is performed without the computerized wireless user device having to perform a scan of a frequency band within which the selected new RF carrier is included, the first IE configured to cause the computerized wireless user device to not perform said scan.

8. A computerized method of operating a wireless access point, the computerized method comprising:
based at least on a determination that at least one RF (radio frequency) carrier in use by the computerized wireless access point requires reassignment, generating a first information element (IE), the first IE comprising: (i) data relating to a selected new RF carrier, and (ii) data relating to a temporal value;
transmitting the first IE to a computerized wireless device associated with the computerized wireless access point, the first IE configured to cause the computerized wireless device to cease operation of one or more functions or applications based on the data relating to the temporal value;
causing transition of operation of the computerized wireless access point to the selected new RF carrier; and
subsequent to the transition and after expiration of the temporal value, establishing wireless data communication between the computerized wireless device and the computerized wireless access point using the selected new RF carrier.

9. The computerized method of claim 8, wherein:
the determination that the at least one RF (radio frequency) carrier in use by the computerized wireless access point requires reassignment comprises receiving data from one of a SAS (Spectrum Access System) or a Domain Proxy (DP), the received data indicating the reassignment from the at least one RF carrier to the selected new RF carrier; and
the transmitting the first IE to the computerized wireless device associated with the computerized wireless access point comprises transmitting via the at least one RF carrier; and
both the at least one RF carrier and the new RF carrier comprises a frequency between 3.550 and 3.700 GHz inclusive.

10. The computerized method of claim 8, further comprising:
establishing a communication session between the computerized wireless device utilizing the at least one RF carrier prior to the determination; and
maintaining the communication session during at least the steps of (i) the generating and (ii) the transmitting.

11. The computerized method of claim 10, further comprising maintaining the communications session during the steps of (iii) causing transition of operation, and (iv) establishing wireless data communication between the computerized wireless device and the computerized wireless access point using the selected new RF carrier.

12. The computerized method of claim 8, further comprising enabling the computerized wireless device to register with a network spectrum allocation process using at least the selected new RF carrier between at least the computerized wireless device and the wireless access point.

13. The computerized method of claim 8, further comprising enabling the computerized wireless device to register with a network spectrum allocation process based at least on data identifying the selected new RF carrier.

14. The computerized method of claim 8, wherein the establishing of the wireless data communication between the computerized wireless device and the computerized wireless access point using the selected new RF carrier comprises effecting the establishing without the computerized wireless device having to perform a scan of a frequency band within which the selected new RF carrier is included to detect the computerized wireless access point.

15. Computerized access node apparatus for use within a managed content distribution network, the computerized access node apparatus comprising:
processor apparatus;
first wireless interface apparatus in data communication with the processor apparatus;
wireless interface apparatus in data communication with the processor apparatus; and
storage apparatus in data communication with the processor apparatus and comprising at least one computer program, the at least one computer program comprising a plurality of instructions which are configured to, when executed by the processor apparatus, cause the computerized access node apparatus to:
based at least on a determination that a first radio frequency (RF) carrier in use by the computerized access node apparatus as part of a communication session with a computerized wireless-enabled client device requires reassignment, generate first data comprising at least (i) data relating to one or more other RF carriers, and (ii) data relating to at least one reattachment criterion; and transmit at least the first data to the computerized wireless-enabled client device via use of the first RF carrier, the transmitted first data configured to cause the computerized wireless user device to transition of operation of the computerized wireless-enabled client device to the at least one of the one or more other RF carriers;

wherein the data relating to the at least one reattachment criterion comprises a data structure indicative of a suspension behavior the computerized wireless-enabled client device.

16. The computerized access node apparatus of claim 15, wherein:
the transition of the operation of the computerized wireless-enabled client device to the at least one of the one or more other RF carriers comprises de-establishment of operation on the first RF carrier;
the data relating to the at least one reattachment criterion comprises a prescribed period of time; and
the transmitted first data is further configured to cause the computerized wireless user device to, after on expiry of a prescribed period of time, attempt to establish wireless data communication between the computerized access node apparatus and the computerized wireless-enabled client device via use of the at least one of the one or more other RF carriers.

17. The computerized access node apparatus of claim 15, wherein the transmitted first data is further configured to cause the computerized wireless user device to attempt to establish wireless data communication between the computerized access node apparatus and the computerized wireless-enabled client device without performance of a prior RF scan.

18. The computerized access node apparatus of claim 15, wherein the transmitted first data is further configured to cause the computerized wireless user device to attempt to establish wireless data communication between the computerized access node apparatus and the computerized wireless-enabled client device after performance of a reduced-scope RF scan, at least one aspect of the reduced-scope RF scan specified by the first data.

19. The computerized access node apparatus of claim 15, wherein:
the computerized wireless-enabled client device comprises a CBRS Citizens Broadband Radios Service (CBRS) fixed wireless access (FWA) device disposed at a user premises and having a second wireless data interface, the second data interface configured for at least wireless data communication with a mobile device of a user;
the computerized access node apparatus comprises at least a CBSD (Citizens Broadband Radio Service Device) disposed outside of the premises, the CBSD configured to utilize a 3rd Generation Partnership Project (3GPP)-based technology; and
the computerized FWA device and CBSD are each associated with a common network operator, and the user comprises a subscriber of the common network operator.

20. The computerized access node apparatus of claim 19, wherein:
the 3GPP-based technology comprises a 3rd Generation Partnership Project (3GPP)-based technology selected from the group consisting of: (i) 5G NR (New Radio), and (ii) Long Term Evolution (LTE);
the CBSD and FWA device are each configured to utilize wireless spectrum within a frequency band between 3.550 and 3.700 GHz inclusive; and
the at least one of the one or more other RF carriers comprises a carrier which a CBRS SAS (spectrum allocation system) has granted to at least one of the CBSD or FWA device for use.

* * * * *

UNITED STATES PATENT AND TRADEMARK OFFICE
CERTIFICATE OF CORRECTION

| | | |
|---|---|---|
| PATENT NO. | : 10,980,025 B2 | Page 1 of 1 |
| APPLICATION NO. | : 16/427186 | |
| DATED | : April 13, 2021 | |
| INVENTOR(S) | : Hossam Hmimy et al. | |

It is certified that error appears in the above-identified patent and that said Letters Patent is hereby corrected as shown below:

On the Title Page

Item [74], delete:
"Gazdzisnki & Associates, PC"
Insert:
--Gazdzinski & Associates, PC--

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*